US012267937B2

(12) United States Patent
Baek et al.

(10) Patent No.: US 12,267,937 B2
(45) Date of Patent: Apr. 1, 2025

(54) TRANSFER CONNECTOR WITH IMPROVED OPERATIONAL RELIABILITY

(71) Applicant: LG Electronics Inc., Seoul (KR)

(72) Inventors: Chaehyun Baek, Seoul (KR); Sunghun Sim, Seoul (KR); Junghyeong Ha, Seoul (KR); Jongseong Ji, Seoul (KR)

(73) Assignee: LG Electronics Inc., Seoul (KR)

( * ) Notice: Subject to any disclaimer, the term of this patent is extended or adjusted under 35 U.S.C. 154(b) by 808 days.

(21) Appl. No.: 17/011,043

(22) Filed: Sep. 3, 2020

(65) Prior Publication Data

US 2021/0315073 A1 Oct. 7, 2021

(30) Foreign Application Priority Data

Apr. 7, 2020 (KR) ........................ 10-2020-0042314

(51) Int. Cl.
*H05B 6/80* (2006.01)
*H05B 6/70* (2006.01)
*H05B 6/72* (2006.01)

(52) U.S. Cl.
CPC ............... *H05B 6/707* (2013.01); *H05B 6/72* (2013.01)

(58) Field of Classification Search
CPC ........... H05B 6/72; H05B 6/705; H05B 6/686
See application file for complete search history.

(56) References Cited

U.S. PATENT DOCUMENTS 2,869,090 A 1/1959 Johanson
4,645,288 A * 2/1987 Stursa .................... H01R 24/50 439/876
4,687,895 A * 8/1987 Chitre .................... H05B 6/806 219/699
8,803,051 B2 * 8/2014 Lee ........................ H05B 6/708 219/746
2015/0206778 A1 * 7/2015 Shimomura ........... H05B 6/705 219/757

(Continued)

FOREIGN PATENT DOCUMENTS

CN 207819010 9/2018
CN 207819010 U * 9/2018

(Continued)

OTHER PUBLICATIONS

EP Extended European Search Report in European Appln. No. 20206754.2, dated Apr. 16, 2021, 12 pages.

*Primary Examiner* — Dana Ross
*Assistant Examiner* — Lawrence H Samuels
(74) *Attorney, Agent, or Firm* — Fish & Richardson P.C.

(57) ABSTRACT

A transfer connector for a cooking appliance includes a body that extends in a first direction and defines a hollow portion therein, a base that is coupled to the body and defines a communication hole in communication with the hollow portion, an electric connection part electrically connected to an external power source and extended in the first direction and penetrating through the hollow portion and the communication hole, and a dielectric material disposed in the hollow portion between an inner circumferential surface of the body and an outer circumferential surface of the electric connection part. The inner circumferential surface of the body surrounds the dielectric material, and the dielectric material surrounds the outer circumferential surface of the electric connection part.

7 Claims, 14 Drawing Sheets

(56) References Cited

U.S. PATENT DOCUMENTS

| | | | | |
|---|---|---|---|---|
| 2015/0305097 | A1* | 10/2015 | Ashida | H01L 21/6875 219/710 |
| 2019/0089143 | A1 | 3/2019 | Malone et al. | |
| 2019/0239340 | A1* | 8/2019 | Trulli | H01R 9/0515 |
| 2020/0015327 | A1* | 1/2020 | Kuchler | H05B 6/70 |
| 2020/0367966 | A1* | 11/2020 | Pfannenstiel | A61B 18/1815 |
| 2021/0329749 | A1* | 10/2021 | Fukui | H05B 6/702 |

FOREIGN PATENT DOCUMENTS

| | | | |
|---|---|---|---|
| KR | 1020200021067 | 2/2020 | |
| WO | WO2004017516 | 2/2004 | |
| WO | WO2018052223 | 3/2018 | |
| WO | WO-2020054754 A1 * | 3/2020 | H05B 6/66 |

* cited by examiner

TRANSFER CONNECTOR WITH IMPROVED OPERATIONAL RELIABILITY

CROSS-REFERENCE TO RELATED APPLICATION

Pursuant to 35 U.S.C. § 119(a), this application claims the benefit of the earlier filing date and the right of priority to Korean Patent Application No. 10-2020-0042314, filed on Apr. 7, 2020, the contents of which are incorporated by reference herein in their entirety.

TECHNICAL FIELD

The present disclosure relates to a transfer connector, and more particularly, a transfer connector that helps to prevent damage in a high-temperature operating environment and improves microwave transmission reliability.

BACKGROUND

An oven is a cooking appliance that may cook food using a heat source in an enclosed environment.

For example, ovens may use microwaves, infrared radiation, convection, etc. to cook food.

A microwave oven may cook food using microwaves. The microwave oven may have a simple structure and provide ease of use.

A microwave oven may have a space that accommodates food, and microwaves for heating the food may be introduced therein. For instance, microwaves generated from an external power source may be transmitted into the space through a waveguide.

In some cases, an antenna may be provided in the space. The microwaves introduced through a waveguide may be emitted into the space by the antenna. The radiated microwaves may be reflected from (or bounce off) a metal inner wall that surrounds the space, and the microwaves may travel to reach the food.

FIG. 1 illustrates an example of a microwave oven. The microwave oven 1000 may have a space 1100 for accommodating food (or cooking ingredients) inside the microwave oven 1000. Microwaves emitted from an antenna 1200 may be transmitted to the space 1100.

The microwaves may be generated from a power source located outside of the microwave oven 1000. The generated microwaves may be transmitted through an electric wire that connects the power source and the antenna 1200.

The antenna 1200 and the electric wire may be respectively connected to a connector 1300. The microwaves transmitted through the electric wire may be transferred to the space 1100 through the antenna 1200 and the connector 1300. The antenna 1200 and the electric wire may be coupled to the microwave oven 1000 via the connector 1300.

FIGS. 2A and 2B illustrate the connector 1300 in FIG. 1. The connector 1300 may include a line connecting portion 1320 connected to the electric wire and a conductive portion 1330 connected to the antenna 1200.

The conductive portion 1330 extends through an inner space of a body part 1310 and the line connecting portion 1320. The conductive portion 1330 is surrounded by an insulating portion 1340 provided in the inner space of the body part 1310.

The insulating portion 1340 may block electric connection between the line connecting portion 1320 and the conductive portion 1330. In some cases, the insulating portion 1340 may support the conductive portion 1330 so as to retain it securely in a specific (or predetermined) position within the space of the body 1310.

The insulating portion 1340 may be made of Teflon, etc. In some example, a maximum continuous service temperature of Teflon may be approximately 250° C. Accordingly, when temperature inside the microwave oven 1000 exceeds 250° C., it may cause thermal damage to the insulating portion 1340.

As a result, insulation reliability between the line connecting portion 1320 and the conductive portion 1330 may be reduced. Operational reliability of the microwave oven 1000 may also be reduced since the conductive portion 1330 may not be held securely in its predetermined position.

In some cases, microwave transmission efficiency may be decreased, which may lead to a decrease in functioning of the microwave oven 1000, for example, heating of food.

In some cases, a microwave system may convert microwaves to be transmitted via a coaxial cable using a waveguide-coaxial cable conversion adapter. The microwave system may perform a method for transmitting microwaves generated from an external power source to a cavity.

In some cases, a microwave oven may include a radiation module including a waveguide that provides a horizontal helical traveling path for microwaves and a pair of slot antennas provided on a bottom surface of the waveguide. The radiation module may radiate microwaves transmitted through the waveguide.

SUMMARY

The present disclosure describes a transfer connector that may be stably operated at a high temperature.

For example, the transfer connector may help to prevent damage in a high-temperature operating environment.

The present disclosure describes a transfer connector that may be connected to an external power source in a stable manner.

For example, the transfer connector may prevent electric connection between each of the components in a high-temperature operating environment.

The transfer connector may effectively dissipate heat.

According to one aspect of the subject matter described in this application, a transfer connector for a cooking appliance includes a body that extends in a first direction and defines a hollow portion therein, a base that is coupled to the body and defines a communication hole in communication with the hollow portion, an electric connection part electrically connected to an external power source and extended in the first direction and penetrating through the hollow portion and the communication hole, and a dielectric material disposed in the hollow portion between an inner circumferential surface of the body and an outer circumferential surface of the electric connection part. The inner circumferential surface of the body surrounds the dielectric material, and the dielectric material surrounds the outer circumferential surface of the electric connection part.

Implementations according to this aspect may include one or more of the following features. For example, the dielectric material may include quartz, silica, mica, or alumina. In some examples, the dielectric material may be coupled to each of the inner circumferential surface of the body and the outer circumferential surface of the electric connection part to thereby block electric connection between the body and the electric connection part.

In some implementations, the base may be configured to be coupled to an oven, and the electric connection part may be configured to transmit microwaves to the oven.

According to another aspect, a transfer connector for a cooking appliance includes a body that extends in a first direction and defines a hollow portion therein, a base that is coupled to the body and defines a communication hole in communication with the hollow portion, an electric connection part electrically connected to an external power source, the electric connection part extending in the first direction and penetrating through the hollow portion and the communication hole, and a guide that faces the base, the base being disposed between the body and the guide. The guide defines a penetrating hole that is in communication with the communication hole and that receives the electric connection part, and an inner surface of the guide surrounds the penetrating hole, and is in contact with an outer circumferential surface of the electric connection part.

Implementations according to this aspect may include one or more of the following features. For example, the guide may include quartz, silica, mica, or alumina. In some examples, a diameter of the hollow portion and a diameter of the communication hole may be greater than a diameter of the electric connection part, and a diameter of the penetrating hole may be less than or equal to the diameter of the electric connection part.

In some implementations, an inner circumferential surface of the body surrounds the hollow portion, and an inner circumferential surface of the base surrounds the communication hole. The electric connection part may be spaced apart from each of the inner circumferential surface of the body and the inner circumferential surface of the base.

According to another aspect, a transfer connector for a cooking appliance includes a body that extends in a first direction and defines a hollow portion therein, a base that is coupled to the body and defines a communication hole in communication with the hollow portion, an electric connection part electrically connected to an external power source, the electric connection part extending in the first direction and penetrating through the hollow portion and the communication hole, a guide that faces the base, the base being disposed between the body and the guide, and a heat dissipation member that is coupled to an outer circumferential surface of the body and extends radially outward with respect to a center of the body.

Implementations according to this aspect may include one or more of the following features. For example, the guide may include a plurality of guide parts spaced apart from one another in the first direction. In some examples, the body may include an engaging protrusion that extends radially inward from an inner circumferential surface of the body toward the center of the body, where the engaging protrusion supports one of the plurality of the guide parts. An inner circumferential surface of the base may surround the communication hole, and the base includes a support protrusion that extends radially inward from the inner circumferential surface of the base toward a center of the base, where the support protrusion supports another one of the plurality of guide parts.

In some implementations, a diameter of the guide may be greater than or equal to a diameter of the hollow portion, and a diameter of the communication hole may be less than the diameter of the hollow portion. In some implementations, the heat dissipation member may include a plurality of heat dissipation members that are spaced apart from one another in the first direction.

According to another aspect, a transfer connector for a cooking appliance includes a body that extends in a first direction and defines a hollow portion therein, a base that is coupled to the body and defines a communication hole in communication with the hollow portion, an electric connection part electrically connected to an external power source, the electric connection part extending in the first direction and penetrating through the hollow portion and the communication hole, a dielectric material disposed in the hollow portion between an inner circumferential surface of the body and an outer circumferential surface of the electric connection part, and a heat dissipation member that is coupled to an outer circumferential surface of the body and extends radially outward with respect to a center of the body. The inner circumferential surface of the body surrounds the dielectric material, and the dielectric material surrounds the outer circumferential surface of the electric connection part.

Implementations according to this aspect may include one or more of the following features. For example, the dielectric material may include quartz, silica, mica, or alumina. In some examples, the heat dissipation member may include a plurality of heat dissipation members that are spaced apart from one another in the first direction.

According to another aspect, a transfer connector for a cooking appliance includes a body that extends in a first direction and defines a hollow portion therein, a base that is coupled to the body and defines a communication hole in communication with the hollow portion, an electric connection part electrically connected to an external power source, the electric connection part extending in the first direction and penetrating through the hollow portion and the communication hole, a guide that faces the base, the base being disposed between the body and the guide, and a heat dissipation member that is coupled to an outer circumferential surface of the body and extends radially outward with respect to a center of the body. The guide defines a penetrating hole that is in communication with the communication hole and that receives the electric connection part, and an inner surface of the guide surrounds the penetrating hole, and is in contact with an outer circumferential surface of the electric connection part.

Implementations according to this aspect may include one or more of the following features. For example, the guide may include quartz, silica, mica, or alumina. In some examples, a diameter of the hollow portion and a diameter of the communication hole may be greater than a diameter of the electric connection part, and a diameter of the penetrating hole may be less than or equal to the diameter of the electric connection part. An inner circumferential surface of the body may surround the hollow portion, and an inner circumferential surface of the base may surround the communication hole. The electric connection part may be spaced apart from each of the inner circumferential surface of the body and the inner circumferential surface of the base.

In some implementations, the heat dissipation member may include a plurality of heat dissipation members that are spaced apart from one another in the first direction.

In some implementations, a transfer connector may include a dielectric material. The dielectric material may be made of a material that may prevent or reduce damage or deformation by heat at a high temperature of 500° C. or higher.

For example, when an oven equipped with the transfer connector is operated at a high temperature, the dielectric material may not be damaged by heat generated in the oven. As a result, the transfer connector may be stably operated in high-temperature operating conditions.

In some implementations, an electric connection part electrically connected to an external power source may be inserted into a body part and a base. The electric connection part may not be exposed to the outside.

In some examples, the electric connection part may not be damaged by heat generated when the oven is operated. Thus, damage to the transfer connector may be prevented or reduced in a high-temperature operation environment.

In some implementations, the electric connection part may be integrally formed with the transfer connector. In some implementations, the electric connection part may be coupled to the body part and the base through the dielectric material. In some implementations, the electric connection part may be coupled to the body part and the base through a guide part.

This allows the electric connection part, the body part, and the base to be securely coupled to one another when compared to the case where the electric connection part is provided as a separate member and connected separately. As a result, electric connection between the transfer connector and the external power source may be securely maintained.

Further, in some implementations, the electric connection part may be accommodated in an inner space of the body part and the base while being surrounded (or covered) by the dielectric material. In some implementations, the electric connection part may be accommodated in the inner space of the body part and the base, and coupled to the guide part to be spaced apart from the body part and the base.

The dielectric material may be made of a heat-proof material that may withstand high temperature. In some implementations, air serves as a dielectric material instead of the dielectric material. Accordingly, when the oven is operated, the electric connection part, the body part, and the base may be electrically separated from one another.

As such, electric connection between the electric connection part, the body part, and the base may be avoided in a high-temperature operating environment.

In some implementations, a heat dissipation member may be provided on an outer circumference of the body part. The heat dissipation member is coupled to or is in contact with the outer circumferential surface of the body part so as to receive heat transferred to the body part. For example, heat generated in the oven may be transmitted to the heat dissipation member through the base and the body part.

The heat dissipation member may be provided in a manner for maximizing an area in contact with external air, and the like. In some examples, the heat dissipation member may be provided in plurality to be in contact with the body part.

In some examples, heat generated when the oven is operated may be rapidly dissipated. This may help to prevent the transfer connector from being damaged by the heat generated in the oven, thereby improving operational reliability of the transfer connector.

DETAILED DESCRIPTION

Hereinafter, one or more examples of a transfer connector will be described in detail with reference to the accompanying drawings.

In the following description, in order to clarify the features of the present disclosure, description of some components may be omitted.

The term "oven" used hereinafter refers to an appliance that may accommodate food (or cooking ingredients) in a space defined therein to heat and cook the food. For example, an oven may include a microwave oven (or microwave range), an electric oven, a gas oven, a stove, or the like.

The term "dielectric material" used hereinafter refers to an insulator that has polarity in an electric field.

Transfer connectors 100, 200, 300, 400, and 500 according to various examples described hereinafter may be provided at an oven. For instance, the transfer connectors 100, 200, 300, 400, and 500 may be coupled to a microwave oven. The transfer connectors 100, 200, 300, 400, and 500 may be provided between an external power source and a cavity which is a space formed inside the oven.

The transfer connectors 100, 200, 300, 400 and 500 may be connected to the external power source by a conductive member (or conducting wire) that serves as a waveguide. Microwaves generated from the external power source may be transmitted into the cavity through the waveguide and the transfer connectors 100, 200, 300, 400, and 500.

The term "electric connection" may be used when two or more members are connected in a manner of allowing an electric current or electrical signal to be transmitted. For example, the electric connection may be achieved by contact between conductive members, or in a wired manner using a conductive member, or the like. Alternatively, the electric connection may be achieved in a wireless manner.

The terms "front side (or part)," "rear side," "left side," "right side," "upper side," and "lower side" used hereinafter will be understood with reference to coordinate systems shown in FIGS. 3, 5, 8, 11 and 13.

In some implementations, the transfer connector 100 includes a dielectric material 150 having high thermal resistance. In some examples, when a temperature inside a cavity of an oven including the transfer connector 100 rises to a high temperature, damage to the dielectric material 150 may be prevented or reduced.

In some examples, thermal resistance of the transfer connector 100 may be improved, thereby ensuring insulation between each of the components constituting the transfer connector 100. Further, an electric connection part 140 supported by the dielectric material 150 may be held securely in a predetermined position.

In some implementations, the transfer connector 100 may be integrally formed with a waveguide. Accordingly, the transfer connector 100 and the waveguide are not separated from each other. As a result, an external power source and the transfer connector 100 may be securely connected to each other.

Figure 1:
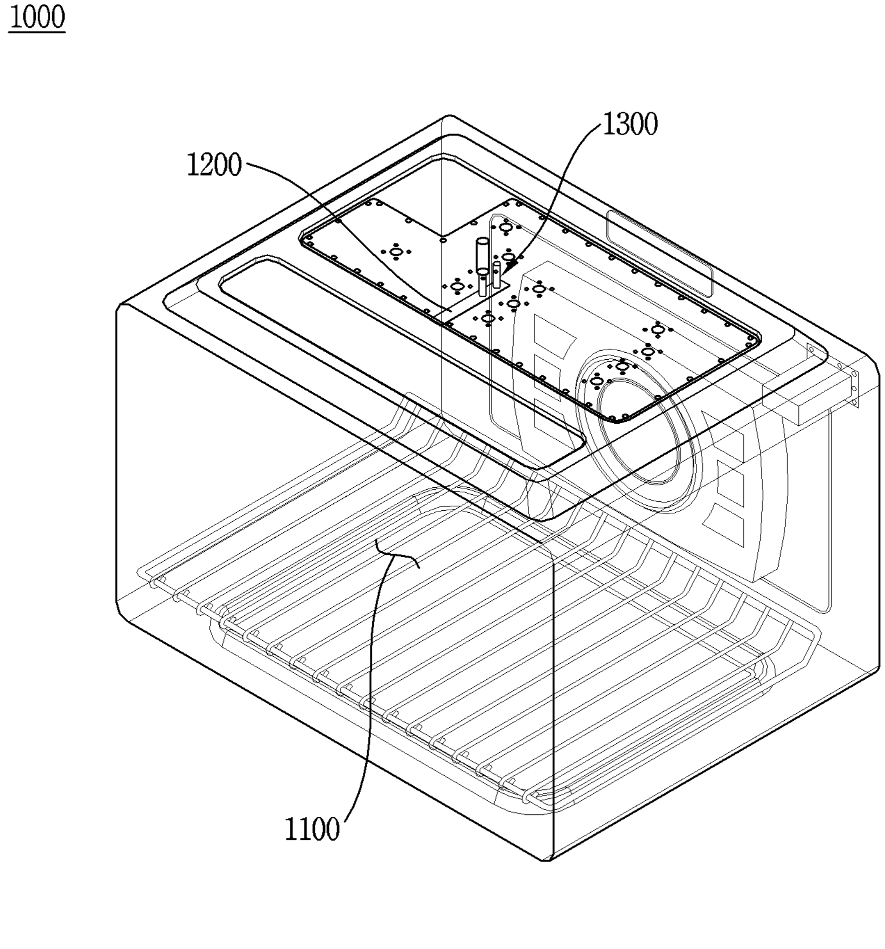
FIG. 1 is a perspective view of an example of an oven.
Figure 2A:
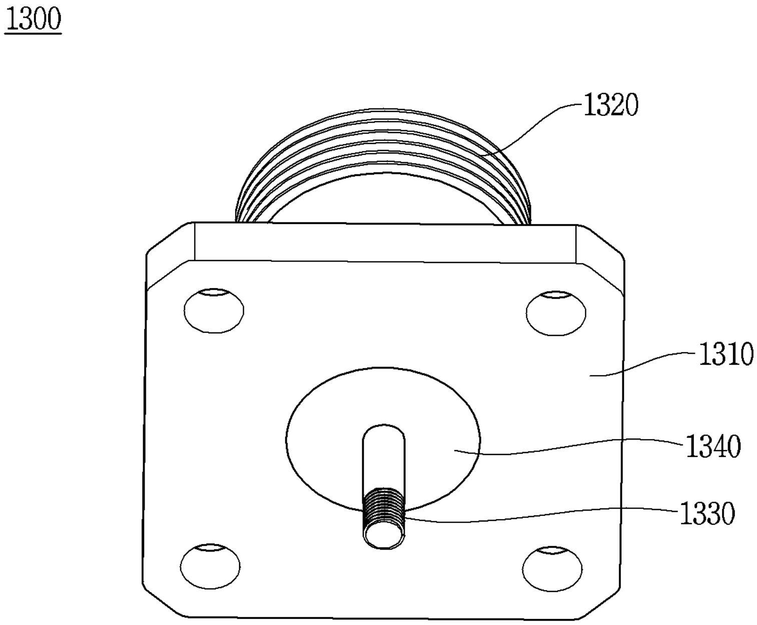
FIG. 2A is a perspective view illustrating an example of a connector in the oven of FIG. 1.
Figure 2B:
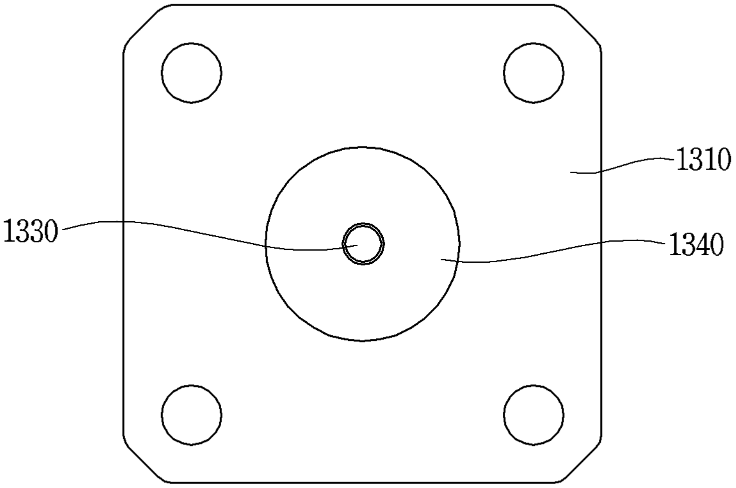
FIG. 2B is a base view illustrating the connector in the oven of FIG. 1.
Figure 3:
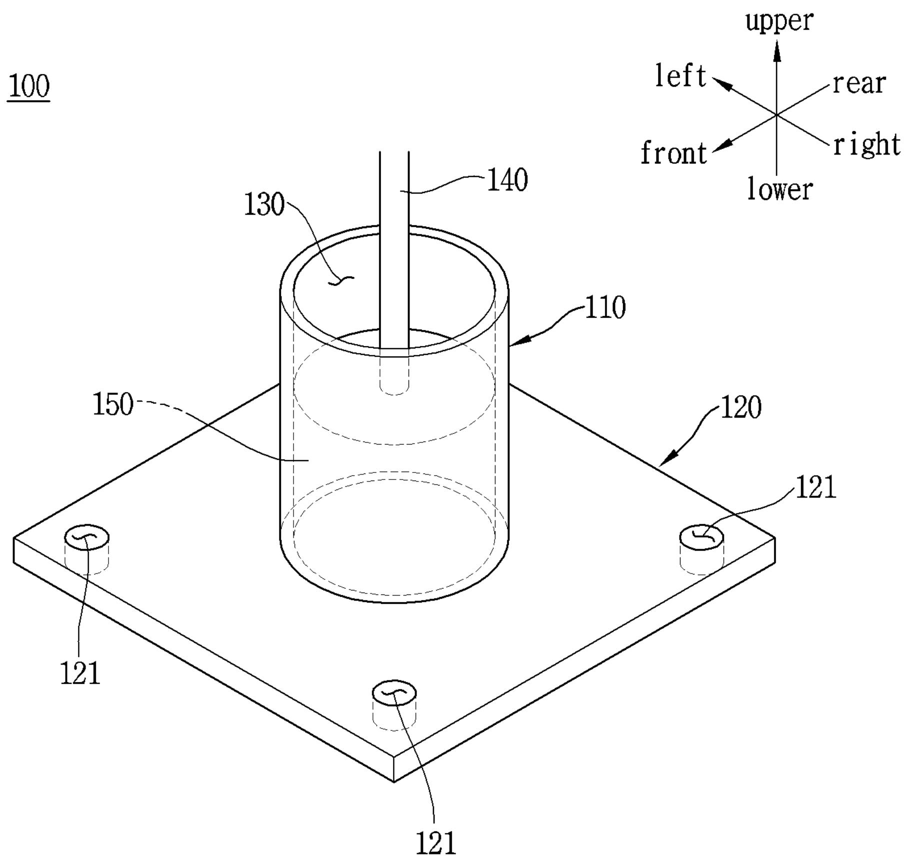
FIG. 3 is a perspective view of an example connector.
Figure 4:
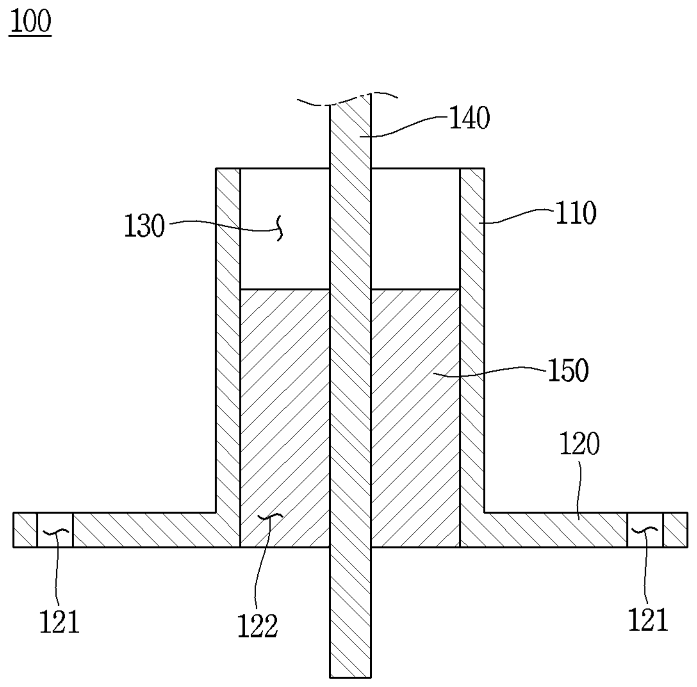
FIG. 4 is a cross-sectional view of the connector of FIG. 3.

Hereinafter, the transfer connector 100 will be described with reference to FIGS. 3 and 4.

The transfer connector 100 may be coupled to an oven. In some implementations, the transfer connector 100 may be provided at an upper side of the oven.

The transfer connector 100 is connected to the external power source through the waveguide. Microwaves generated from the external power source may be transmitted to the transfer connector 100 through the waveguide.

The transfer connector 100 is connected to an antenna member provided at a cavity of the oven. The microwaves transmitted to the transfer connector 100 may be emitted or radiated into the cavity via the antenna member.

Accordingly, the microwaves may be incident on food accommodated in the cavity in various directions. This allows the food to be quickly heated.

In some implementations, the transfer connector 100 may include a body or a body part 110, a base 120, a hollow portion 130, the electric connection part 140, and the dielectric material 150.

The body part 110 defines a body of the transfer connector 100.

In some implementations, the body part 110 extends in one direction (or a first direction), for example, a vertical (or up-and-down) direction with respect to the base 120. In some implementations, the body part 110 may have a cylindrical shape with a circular cross section.

The body part 110 may define therein the hollow portion 130 that extends in a direction in which the body part 110 extends, for example, the vertical direction. The electric connection part 140 electrically connected to the waveguide and the antenna member may be accommodated in the hollow portion 130. An inner circumferential surface of the body part 110 surrounds the hollow portion 130.

The body part 110 may have a shape that may be supported on the base 120, define a space therein, and be connected to the waveguide.

The body part 110 may be connected to the waveguide. In some implementations, the body part 110 may be integrally formed with the waveguide. Accordingly, the transfer connector 100 and the waveguide may not be separated from each other. As a result, connection reliability between the transfer connector 100 and the waveguide may be improved.

The body part 110 may be made of a conductive material. In addition, the body part 110 may be made of a material having high rigidity and high thermal resistance. This is to prevent damage from external shock or high heat generated in the oven.

In some implementations, the body part 110 may be made of a steel material.

The base 120 is located beneath the body part 110. The body part 110 is supported by the base 120.

The base 120 supports the body part 110. In addition, the base 120 allows the transfer connector 100 to be coupled to the oven. For example, the body part 110 may be coupled to the base 120 that is coupled to the oven.

In some examples, the base 120 may be provided in the form of a plate. This is to minimize a space occupied by the transfer connector 100 in the oven. In some implementations, the base 120 is formed in a square plate shape.

The base 120 may be made of a conductive material. In addition, the base 120 may be made of a material having high rigidity and high thermal resistance. This is to help to prevent damage from external shock or high heat generated in the oven.

For example, the base 120 may be made of a steel material.

In some implementations, the base 120 is located beneath the body part 110. The base 120 may be coupled to a lower end of the body part 110. In some implementations, the base 120 may be integrally formed with the body part 110.

In some implementations, the base 120 may define a fastening member penetrating portion (e.g., a through-hole) 121 and a communication hole 122.

The fastening member penetrating portion 121 is formed through the base 120. The fastening member penetrating portion 121 penetrates in a thickness direction of the base 120, namely the vertical direction in some implementations.

A fastening member that allows the base 120 to be coupled to the oven is penetratingly coupled to the fastening member penetrating portion 121. In some implementations, the fastening member may be configured as a screw or rivet.

The fastening member penetrating portion 121 is located radially outward of the body part 110. In some implementations, the fastening member penetrating portion 121 is located radially outward of the body part 110 to be adjacent to a corner of the base 120.

The fastening member penetrating portion 121 may be provided in plurality. The plurality of fastening member penetrating portions 121 may be spaced apart from each other to be located radially outward of the body part 110. In some implementations, four fastening member penetrating portions 121 are provided near the respective corners of the base 120.

The number and position of the fastening member penetrating portions 121 may vary according to a coupling structure between the transfer connector 100 and the oven.

The communication hole 122 is formed through the base 120. The communication hole 122 penetrates in a direction toward the body part 110 and a direction opposite to the body part 110, namely the vertical direction in some implementations.

The communication hole 122 communicates with the hollow portion 130 formed inside the body part 110. The communication hole 122 may be aligned with the hollow portion 130. In some implementations, the communication hole 122 may have a circular cross section corresponding to the hollow portion 130.

The electric connection part 140, which is inserted into the hollow portion 130, penetrates through the hollow portion 130 and the communication hole 122 so as to be connected to the antenna member provided in the oven. Accordingly, microwaves transmitted to the electric connection part 140 through the waveguide may be transferred to the antenna member.

The hollow portion 130 is a space to which the electric connection part 140 is penetratingly coupled. In addition, the hollow portion 130 may be partially filled with the dielectric material 150.

The hollow portion 130 is provided inside the body part 110. In detail, the hollow portion 130 is formed through the body part 110. The hollow portion 130 may be defined as a space surrounded by the inner circumferential surface of the body part 110.

The hollow portion 130 extends in a direction in which the body part 110 extends, namely the vertical direction in the illustrated direction. An upper side of the hollow portion 130 may be formed through an upper surface of the body part 110. A lower side of the hollow portion 130 may communicate with the communication hole 122 of the base 120.

The hollow portion 130 may have a shape that allows the electric connection part 140 to be penetratingly coupled thereto and the dielectric material 150 to be partially filled therein. In some implementations, the hollow portion 130 has a circular cross section and is formed in a cylindrical shape extending in the vertical direction.

The electric connection part 140 is electrically connected to the external power source and the antenna member provided in the oven. That is, the electric connection part 140 provides electric connection between the external power source and the antenna member. Accordingly, the electric connection part 140 may transmit microwaves generated from the external power source to the antenna member.

The electric connection part 140 is coupled to the hollow portion 130 and the communication hole 122 in a penetrating manner. In some implementations, the electric connection part 140 extends to a lower side of the base 120 through the communication hole 122 by passing through an upper opening of the hollow portion 130.

An end of the electric connection part 140 exposed to an outside of the base 120, namely a lower end of the electric connection part 140 in some implementations is coupled to the antenna member. Accordingly, the electric connection part 140 and the antenna member are electrically connected to each other.

In an implementation in which the waveguide is integrally formed with the body part 110, the electric connection part 140 may extend from the waveguide. That is, unlike the illustrated implementation in which the electric connection part 140 is provided separately so as to be connected to the waveguide, the electric connection part 140 may extend directly from the waveguide in the implementation.

The electric connection part 140 may be made of a conductive material. This is to allow microwaves smoothly move (or travel) between the external power source, the waveguide, and the antenna member. In some implementations, the electric connection part 140 may be made of a copper or brass material.

In some implementations, the electric connection part 140 has a circular cross section and extends in a direction in which the body part 110 extends, namely the vertical direction. A diameter of the cross section of the electric connection part 140 may be less (or smaller) than that of the hollow portion 130 and the communication hole 122.

Accordingly, an outer circumferential surface of the electric connection part 140, the inner circumferential surface of the body part 110, and an inner circumferential surface of the base 120 are spaced apart from one another. The dielectric material 150 is partially filled in a space generated therebetween.

The electric connection part 140 is supported by the dielectric material 150. That is, the outer circumferential surface of the electric connection part 140 penetratingly coupled to the hollow portion 130 and the communication hole 122 is surrounded by the dielectric material 150.

Once the electric connection part 140 is penetratingly coupled to the hollow portion 130 and the communication hole 122, it may not be shaken or moved, thereby ensuring operational reliability of the transfer connector 100.

The dielectric material 150 prevents electric connection between the body part 110 and the electric connection part 140. In addition, the dielectric material 150 supports the electric connection part 140 that is inserted into the hollow portion 130 and the communication hole 122.

The dielectric material 150 may be made of an insulating material. This is to prevent electric connection between the body part 110 and the electric connection part 140.

The dielectric material 150 may be made of a material that may minimize damage or deformation caused by heat in a high temperature environment. This is to prevent the dielectric material 150 from being damaged by heat. As the microwave oven is operated, the temperature inside the cavity increases and heat is generated accordingly. For example, the high temperature may be 500° C. or higher.

In some implementations, the dielectric material 150 may be made of at least one of quartz, silica, mica, or alumina materials.

The dielectric material 150 is disposed at the hollow portion 130 and the communication hole 122. In detail, the dielectric material 150 extends from one point of the hollow portion 130 to the communication hole 122. In some implementations, the dielectric material 150 extends from a height of ⅔ of the hollow portion 130 to the communication hole 122.

The dielectric material 150 is located radially outward of the electric connection part 140. The dielectric material 150 surrounds the outer circumferential surface of the electric connection part 140. The dielectric material 150 is coupled to the outer circumferential surface of the electric connection part 140, so as to surround the electric connection part 140. The dielectric material 150 may be coupled to the outer circumferential surface of the electric connection part 140.

The dielectric material 150 is located radially inward of the inner circumferential surface of the body part 110 and an inner circumferential surface of the communication hole 122. Each of the inner circumferential surfaces of the body part 110 and the communication hole 122 surrounds the dielectric material 150. The dielectric material 150 may be coupled to each of the inner circumferential surfaces of the body part 110 and the communication hole 122.

In other words, the inner circumferential surfaces of the body part 110 and the communication hole 122 are located radially outward of the dielectric material 150. In addition, the electric connection part 140 is located radially inward of the dielectric material 150.

The dielectric material 150 is coupled to each of the inner circumferential surfaces of the body part 110 and the base 120. Accordingly, the dielectric material 150 may not be moved inside the hollow portion 130 and the communication hole 122.

In some implementations, the dielectric material 150 and each of the inner circumferential surfaces of the body part 110 and the base 120 are joined together through brazing using a metal or ceramic material.

The dielectric material 150 is coupled to the outer circumferential surface of the electric connection part 140. Accordingly, the electric connection part 140 may not be moved inside the hollow portion 130 and the communication hole 122.

In some implementations, the dielectric material 150 and the outer circumferential surface of the electric connection part 140 may be joined together through brazing using a metal or ceramic material.

In some examples, the transfer connector 100 may include the dielectric material 150 with high thermal resistance.

The dielectric material 150 is filled in the hollow portion 130 and the communication hole 122. The dielectric material 150 is coupled to the inner circumferential surface of the body part 110 that surrounds the hollow portion 130 and the inner circumferential surface of the base 120 that surrounds the communication hole 122. In addition, the electric connection part 140 is accommodated in the dielectric material 150. The dielectric material 150 is coupled to the outer circumferential surface of the electric connection part 140.

In some examples, when the oven equipped with the transfer connector 100 is operated at a high temperature of 250° C. or higher, damage to the dielectric material 150 may be prevented or reduced. This may allow the dielectric material 150, the body part 110, the base 120, and the electric connection part 140 to be securely coupled to one another.

As a result, reliability of electric connection between the antenna member and the external power source is increased. Thus, operational reliability of the oven having the transfer connector 100 may be improved.

In some examples, the transfer connector 200 may not include a dielectric material, and instead air may be utilized as a dielectric material. Accordingly, even when temperature inside a cavity of an oven at which the transfer connector 200 is provided rises to a high temperature, structural deformation of the transfer connector 200 may be minimized.

In addition, thermal resistance of the transfer connector 200 may be improved, thereby ensuring insulation between each of the components constituting the transfer connector 200. Further, an electric connection part 240 supported by a guide or guide part (e.g., a bottom plate) 250 may be held securely in a predetermined position.

In some implementations, the transfer connector 200 may be integrally formed with a waveguide. Accordingly, the transfer connector 200 and the waveguide are not separated from each other. As a result, an external power source and the transfer connector 200 may be securely connected to each other.

Figure 5:
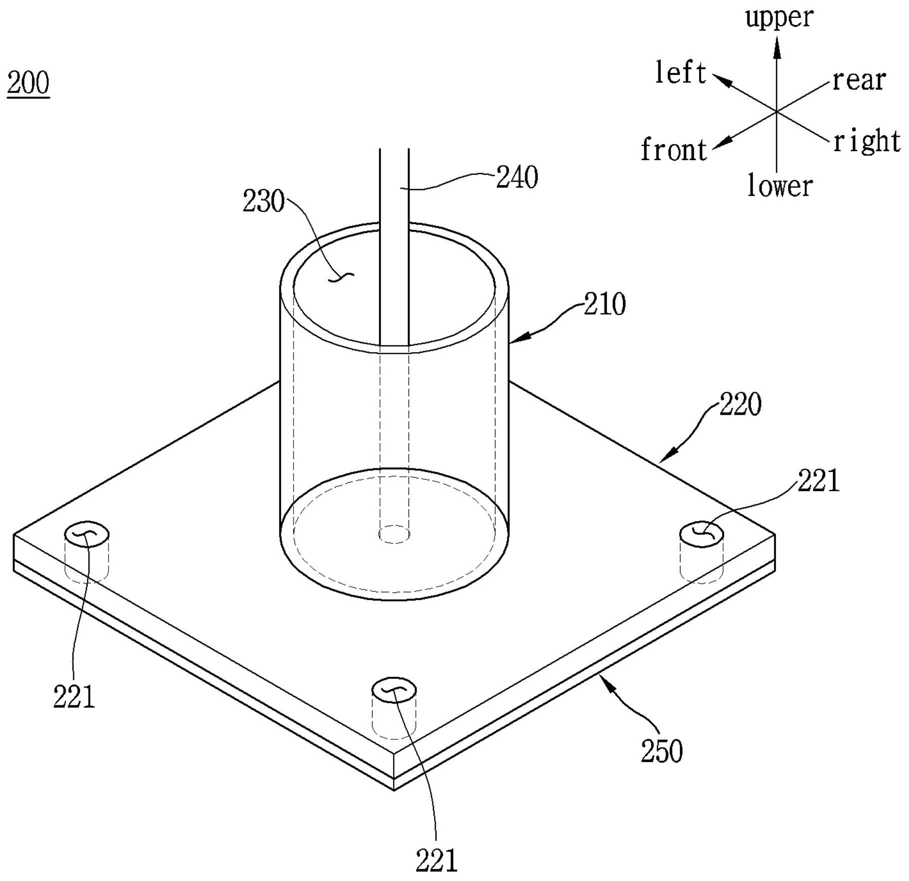
FIG. 5 is a perspective view illustrating an example connector.
Figure 6:
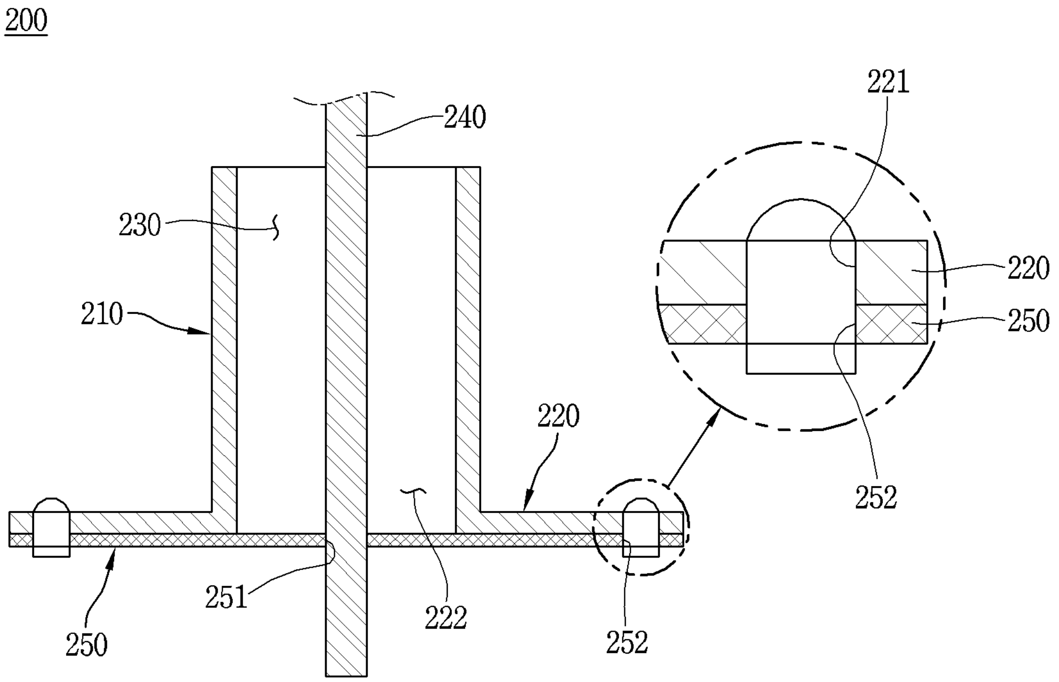
FIG. 6 is a cross-sectional view of the connector of FIG. 5.
Figure 7:
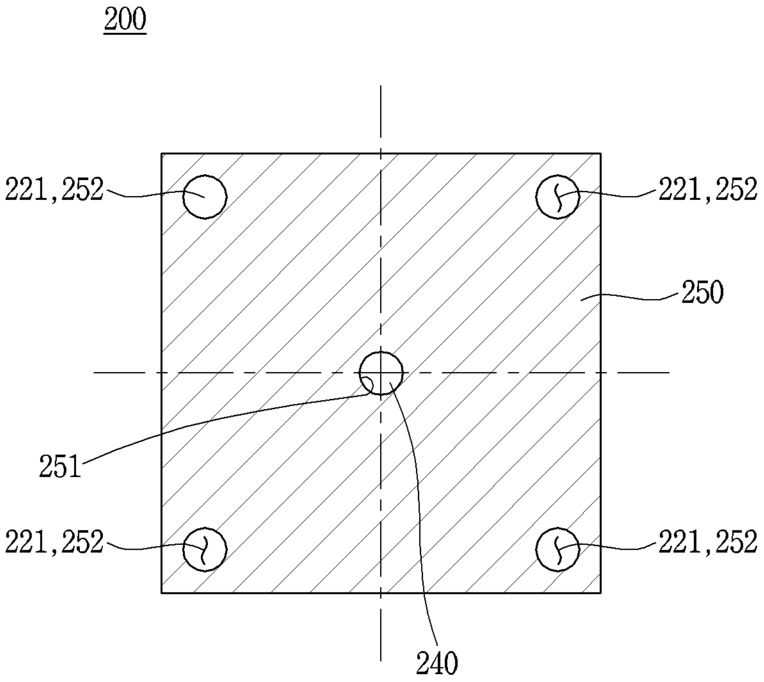
FIG. 7 is a base view of the connector of FIG. 5.

Hereinafter, the transfer connector 200 will be described with reference to FIGS. 5 to 7.

The transfer connector 200 is coupled to an oven. In some implementations, the transfer connector 200 may be provided at an upper side of the oven.

The transfer connector 200 is connected to the external power source through the waveguide. Microwaves generated from the external power source may be transmitted to the transfer connector 200 through the waveguide.

The transfer connector 200 is connected to an antenna member provided at a cavity of the oven. The microwaves transmitted to the transfer connector 200 may be emitted or radiated into the cavity via the antenna member.

Accordingly, the microwaves may be incident on food accommodated in the cavity in various directions. This allows the food to be quickly heated.

In some implementations, the transfer connector 200 includes a body part 210, a base 220, a hollow portion 230, the electric connection part 240, and the guide part 250.

The body part 210 defines the body of the transfer connector 200.

The body part 210 extends in one direction, namely a vertical (or up-and-down) direction in some implementations. In some implementations, the body part 210 has a cylindrical shape with a circular cross section.

The hollow portion 230 is provided therein with the hollow portion 230 that extends in a direction in which the body part 210 extends, namely the vertical direction in some implementations. The electric connection part 240 electrically connected to the waveguide and the antenna member is accommodated in the hollow portion 230. An inner circumferential surface of the body part 210 surrounds the hollow portion 230.

The body part 210 may be formed in a shape that may be supported on the base 220, have a space formed therein, and be connected to the waveguide.

The body part 210 is connected to the waveguide. In some implementations, the body part 210 may be integrally formed with the waveguide. Accordingly, the transfer connector 200 and the waveguide may not be separated from each other. As a result, connection reliability between the transfer connector 200 and the waveguide may be improved.

The body part 210 may be made of a conductive material. In addition, the body part 210 may be made of a material having high rigidity and high thermal resistance. This is to prevent damage from external shock or high heat generated in the oven.

In some implementations, the body part 210 may be made of a steel material.

The base 220 may be located beneath the body part 210. The body part 210 is supported by the base 220.

The base 220 supports the body part 210. In addition, the base 220 allows the transfer connector 200 to be coupled to the oven.

The base 220 may be provided in the form of a plate. This is to minimize a space occupied by the transfer connector 200 in the oven. In some implementations, the base 220 is formed in a square plate shape.

The base 220 may be made of a conductive material. In addition, the base 220 may be made of a material having high rigidity and high thermal resistance. This is to prevent damage from external shock or high heat generated in the oven.

In some implementations, the base 220 may be made of a steel material.

In some implementations, the base 220 is located beneath the body part 210. The base 220 may be coupled to a lower end of the body part 210. In some implementations, the base 220 may be integrally formed with the body part 210.

In some implementations, the base 220 includes a fastening member penetrating portion 221 and a communication hole 222.

The fastening member penetrating portion 221 is formed through the base 220. The fastening member penetrating portion 221 penetrates in a thickness direction of the base 220, namely the vertical direction in some implementations.

A fastening member that allows the base 220 to be coupled to the oven is penetratingly coupled to the fastening member penetrating portion 221. In some implementations, the fastening member may be configured as a screw or rivet.

The fastening member penetrating portion 221 is located radially outward of the body part 210. In some implementations, the fastening member penetrating portion 221 is located radially outward of the body part 210 to be adjacent to a corner of the base 220.

The fastening member penetrating portion 221 may be provided in plurality. The plurality of fastening member penetrating portions 221 may be spaced apart from each other to be located radially outward of the body part 210. In some implementations, four fastening member penetrating portions 221 are provided near the respective corners of the base 220.

The number and position of the fastening member penetrating portions 221 may vary according to a coupling structure between the transfer connector 200 and the oven.

The communication hole 222 is formed through the base 220. The communication hole 222 penetrates in a direction toward the body part 210 and a direction opposite to the body part 210, namely the vertical direction in some implementations.

The communication hole 222 communicates with the hollow portion 230 formed inside the body part 210. The communication hole 222 may be aligned with the hollow portion 230. In some implementations, the communication hole 222 may have a circular cross section corresponding to the hollow portion 230.

The electric connection part 240, which is inserted into the hollow portion 230, penetrates through the hollow portion 230 and the communication hole 222 to be connected to the antenna member provided in the oven. Accordingly, microwaves transmitted to the electric connection part 240 through the waveguide may be transferred to the antenna member.

The hollow portion 230 is a space to which the electric connection part 240 is penetratingly coupled.

The hollow portion 230 is provided inside the body part 210. In detail, the hollow portion 230 is formed through the body part 210. The hollow portion 230 may be defined as a space surrounded by the inner circumferential surface of the body part 210.

The hollow portion 230 extends in a direction in which the body part 210 extends, namely the vertical direction in some implementations. An upper side of the hollow portion 230 may be formed through an upper surface of the body part 210. A lower side of the hollow portion 230 may communicate with the communication hole 222 of the base 220.

The hollow portion 230 may have a shape that allows the electric connection part 240 to be penetratingly coupled thereto. In some implementations, the hollow portion 230 has a circular cross section and is formed in a cylindrical shape extending in the vertical direction.

The hollow portion 230 communicates with the communication hole 222. The electric connection part 240 inserted into the hollow portion 230 may extend to the communication hole 222.

The hollow portion 230 is empty except an area (or portion) in which the electric connection part 240 is accommodated. That is, air is received in the remaining area. The air accommodated in the hollow portion 230 serves as a dielectric material that provides insulation between the electric connection part 240 and the body part 210.

The electric connection part 240 is electrically connected to the external power source and the antenna member provided in the oven. That is, the electric connection part 240 provides electric connection between the external power source and the antenna member. Accordingly, the electric connection part 240 may transmit microwaves generated from the external power source to the antenna member.

The electric connection part 240 is coupled to the hollow portion 230 and the communication hole 222 in a penetrating manner. In some implementations, the electric connection part 240 extends to a lower side of the base 220 through the communication hole 222 by passing through an upper opening of the hollow portion 230.

An end of the electric connection part 240 exposed to an outside of the base 220, namely a lower end of the electric connection part 240 in some implementations is coupled to the antenna member. Accordingly, the electric connection part 240 and the antenna member are electrically connected to each other.

In an implementation in which the waveguide is integrally formed with the body part 210, the electric connection part 240 may extend from the waveguide. That is, unlike the illustrated implementation in which the electric connection part 240 is provided separately so as to be connected to the waveguide, the electric connection part 240 may extend directly from the waveguide in the implementation.

The electric connection part 240 may be made of a conductive material. This is to allow microwaves to smoothly travel or move between the external power source, the waveguide, and the antenna member. In some implementations, the electric connection part 240 may be made of a copper or brass material.

In some implementations, the electric connection part 240 has a circular cross section and extends in a direction in which the body part 210 extends, namely the vertical direction. A diameter of the cross section of the electric connection part 240 may be less than a diameter of a cross section of the hollow portion 230. Accordingly, an outer circumferential surface of the electric connection part 240 and the inner circumferential surface of the body part 210 are spaced apart from each other.

In addition, the diameter of the cross section of the electric connection part 240 may be less than a diameter of a cross section of the communication hole 222 of the base 220. Accordingly, the outer circumferential surface of the electric connection part 240 and an inner circumferential surface of the base 220 are also spaced apart from each other.

Further, the diameter of the cross section of the electric connection part 240 may be equal to a diameter of a cross section of a first penetrating portion (e.g., hole) 251 of the guide part 250. For example, the first penetrating portion 251 may be a through-hole that receives the electric connection part 240. In some examples, the outer circumferential surface of the electric connection part 240 and an inner circumferential surface of the guide part 250 may be in contact with each other.

The electric connection part 240 is supported by the guide part 250. That is, the outer circumferential surface of the electric connection part 240 that is penetratingly coupled to the hollow portion 230 and the communication hole 222 is brought into contact with the inner circumferential surface of the guide part 250 that surrounds the first penetrating portion 251 provided at the guide part 250.

The outer circumferential surface of the electric connection part 240 may be coupled to the inner circumferential surface of the guide part 250. In some implementations, the outer circumferential surface of the electric connection part 240 and the inner circumferential surface of the guide part 250 may be joined together through brazing using a metal or ceramic material.

Once the electric connection part 240 is penetratingly coupled to the hollow portion 230 and the communication hole 222, it may not be shaken or moved, thereby ensuring operational reliability of the transfer connector 200.

The guide part 250 supports the base 220. In addition, the guide part 250 supports the electric connection part 240 penetratingly coupled to the hollow portion 230 and the communication hole 222.

The guide part 250 may be made of an insulating material. This is to prevent electric connection between the body part 210 and the electric connection part 240.

The guide part 250 may be made of a material that may minimize damage or deformation caused by heat in a high-temperature environment. This is to prevent the guide part 250 from being damaged by heat. As the microwave oven is operated, the temperature inside the cavity increases and heat is generated accordingly. For example, the high temperature may be 500° C. or higher.

In some implementations, the guide part 250 may be made of a material that allows microwaves to pass therethrough and prevents electric connection.

For example, the guide part 250 may be made of at least one of quartz, silica, mica, and alumina materials.

The guide part 250 supports the base 220. In some implementations, the guide part 250 is located beneath the base 220. The guide part 250 is coupled to a lower surface of the base 220.

The guide part 250 may have a shape suitable for being coupled to the base 220. In some implementations, the guide part 250 is formed in a square plate shape corresponding to the base 220. The shape of the guide part 250 may vary according to the shape of base 220.

The guide part 250 is coupled to the base 220. In detail, surfaces that the guide part 250 and the base 220 face each other may be coupled to be in close contact with each other.

In some implementations, the surfaces that the guide part 250 and the base 220 face each other may be joined together through brazing using a metal or ceramic material.

In some implementations, the guide part 250 includes the first penetrating portion 251 and a second penetrating portion 252.

The first penetrating portion 251 is a space to which the electric connection part 240 is penetratingly coupled. The first penetrating portion 251 is formed through the guide part 250. The electric connection part 240 penetratingly coupled to the hollow portion 230 may extend to the first penetrating portion 251 in a penetrating manner, so as to be coupled to the antenna member.

The first penetrating portion 251 communicates with the communication hole 222 and the hollow portion 230. The electric connection part 240 inserted into the hollow portion 230 may be inserted into the communication hole 222 and the first penetrating portion 251.

The first penetrating portion 251 extends in a direction in which the body part 210 extends, namely the vertical direction in some implementations.

The first penetrating portion 251 communicates with the hollow portion 230. The electric connection part 240 penetratingly coupled to the hollow portion 230 may extend to the first penetrating portion 251.

The first penetrating portion 251 is disposed to overlap the hollow portion 230. In some implementations, the first penetrating portion 251 may be disposed to have the same central axis as the hollow portion 230.

In some implementations, the first penetrating portion 251 has a circular cross section. A diameter of the first penetrating portion 251 may be less than or equal to a diameter of the electric connection part 240. In an implementation in which the diameter of the first penetrating portion 251 is less than the diameter of the electric connection part 240, the electric connection part 240 may be fitted to the first penetrating portion 251.

A surface that surrounds the first penetrating portion 251, namely the inner circumferential surface of the guide part 250 may be coupled to the outer circumferential surface of the electric connection part 240.

In some implementations, the inner circumferential surface of the guide part 250 and the outer circumferential surface of the electric connection part 240 may be joined together through brazing using a metal or ceramic material. This allows to prevent the electric connection part 240 penetratingly coupled to the first penetrating portion 251 from being moved vertically or horizontally.

The second penetrating portion 252 is a space to which the fastening member that allows the guide part 250 and the base 220 to be coupled to each other is penetratingly coupled.

The fastening member may be penetratingly coupled to the second penetrating portion 252 and the fastening member penetrating portion 221. The second penetrating portion 252 communicates with the fastening member penetrating portion 221.

The second penetrating portion 252 is formed through the guide part 250. The second penetrating portion 252 is located radially outward of the first penetrating portion 251.

The second penetrating portion 252 may be provided in plurality. The plurality of second penetrating portions 252 may be spaced apart from one another. In some implementations, four second penetrating portions 252 are disposed to be adjacent to the respective corners of the guide part 250.

The second penetrating portion 252 may overlap the fastening member penetrating portion 221. The second penetrating portion 252 may be disposed to have the same central axis as the fastening member penetrating portion 221.

In some implementations, the second penetrating portion 252 may have a diameter of its cross section equal to a diameter of a cross section of the fastening member penetrating portion 221, and have a circular shape with the same central axis as the fastening member penetrating portion 221.

In some examples, the transfer connector 300 may not include a dielectric material that provides insulation between the body part 210 and the electric connection part 240.

The electric connection part 240 is accommodated in the hollow portion 230 formed inside the body part 210. The electric connection part 240 is spaced apart from the inner circumferential surface of the body part 210, namely a surface that surrounds the hollow portion 230. Thus, the electric connection part 240 and the body part 210 are not electrically connected to each other.

A lower side of the electric connection part 240 is supported by the guide part 250. That is, the lower side of the electric connection part 240 is inserted into the first penetrating portion 251 formed through the guide part 250. The diameter of the first penetrating portion 251 is less than or equal to the diameter of the cross section of the electric connection part 240, thereby preventing the inserted electric connection part 240 from being shaken or moved.

When the oven is operated at a high temperature of 250° C. or higher, damage to a dielectric material may occur. In order to prevent this, the dielectric material, which may be damaged by the high temperature, may not be provided in the transfer connector 200.

Accordingly, the body part 210, the base 220, and the electric connection part 240 may be securely coupled to one another.

As a result, reliability of electric connection between the antenna member and the external power source is increased. Thus, operational reliability of the oven equipped with the transfer connector 200 may be improved.

In some implementations, the transfer connector 300 may not include a dielectric material, and instead air may be used as a dielectric material. Accordingly, even when temperature inside a cavity of an oven at which the transfer connector 300 is provided rises to a high temperature, structural deformation of the transfer connector 300 may be minimized.

In addition, thermal resistance of the transfer connector 300 may be improved, thereby ensuring insulation between each of the components constituting the transfer connector 300. Further, an electric connection part 340 supported by a guide part 350 may be held securely in a predetermined position.

In some examples, the transfer connector 300 may include a heat dissipation member 360 for dissipating heat generated in the oven. Accordingly, heat generated when the oven is operated may be quickly and effectively dissipated.

As a result, damage to the transfer connector 300 due to heat generated in the oven may be prevented.

In some implementations, the transfer connector 300 may be integrally formed with a waveguide. Accordingly, the transfer connector 300 and the waveguide are not separated from each other. As a result, an external power source and the transfer connector 300 may be securely connected to each other.

Figure 8:
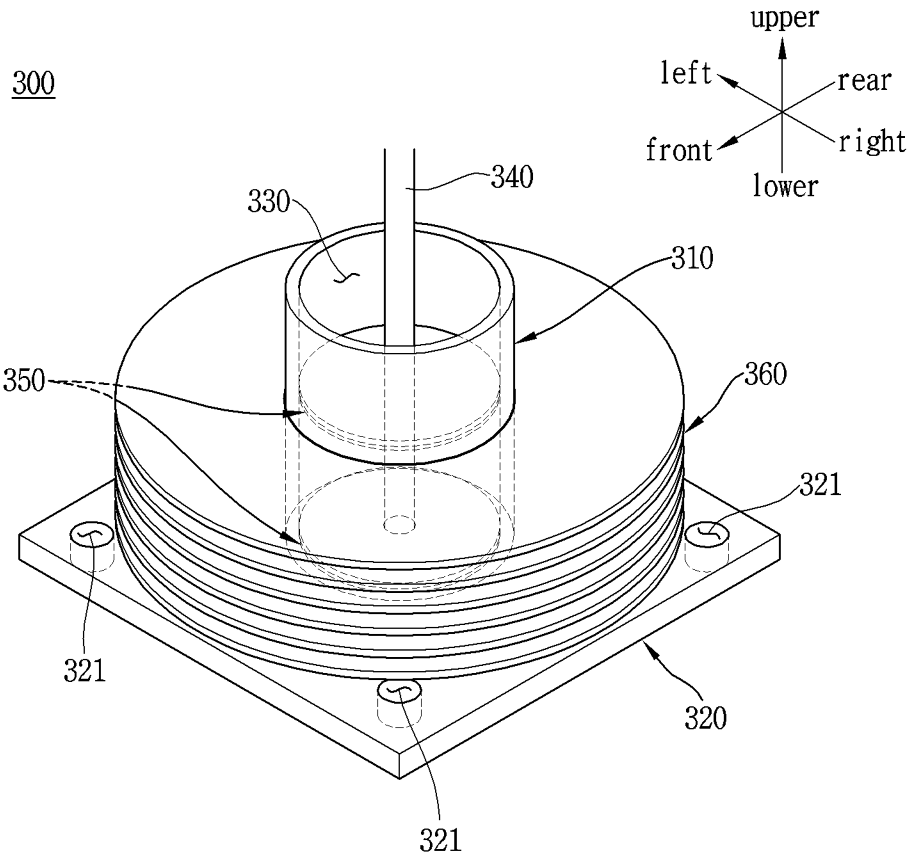
FIG. 8 is a perspective view illustrating an example connector.
Figure 9:
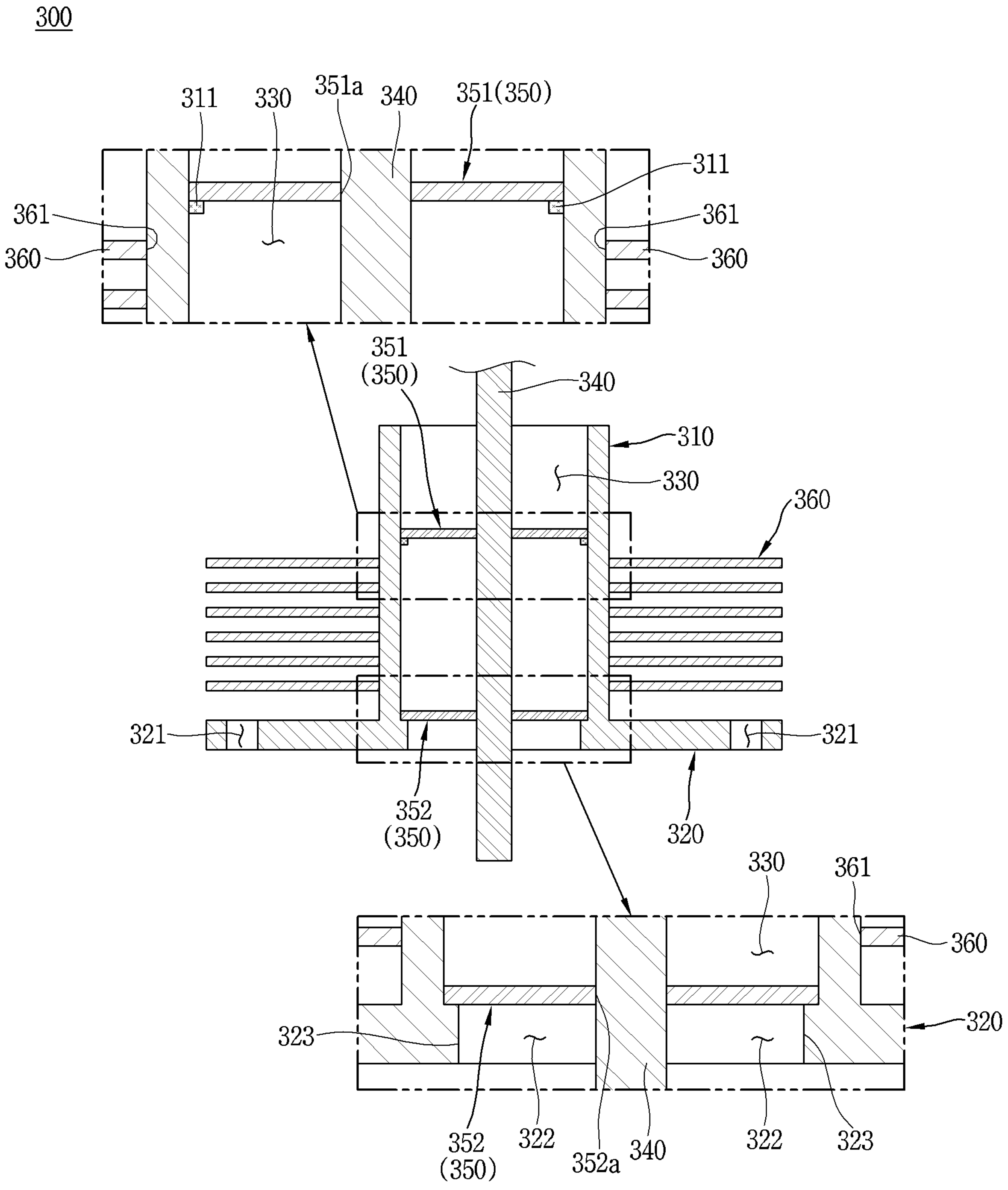
FIG. 9 is a cross-sectional view of the connector of FIG. 8.
Figure 10:
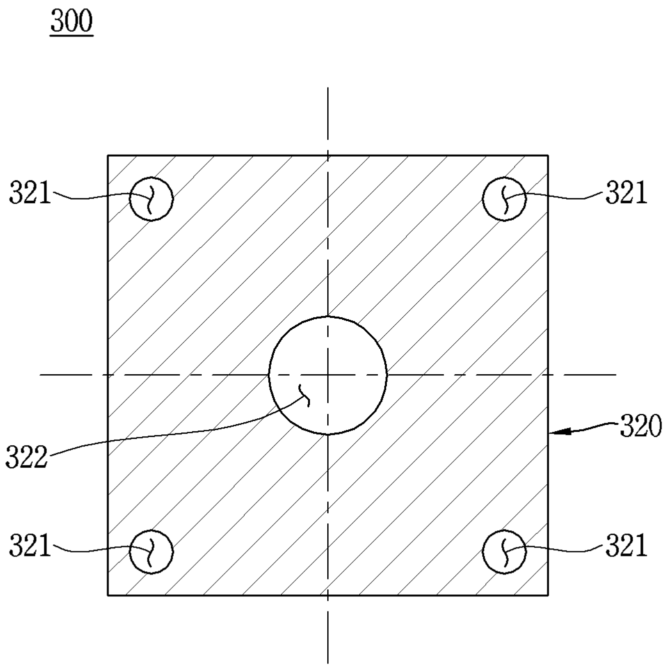
FIG. 10 is a base view of the connector of FIG. 8.

Hereinafter, the transfer connector 300 will be described with reference to FIGS. 8 to 10.

The transfer connector 300 is coupled to the oven. In some implementations, the transfer connector 300 may be provided at an upper side of the oven.

The transfer connector 300 is connected to the external power source through the waveguide. Microwaves generated from the external power source may be transmitted to the transfer connector 300 through the waveguide.

The transfer connector 300 is connected to an antenna member provided at a cavity of the oven. The microwaves transmitted to the transfer connector 300 may be emitted or radiated into the cavity via the antenna member.

Accordingly, the microwaves may be incident on food accommodated in the cavity in various directions. This allows the food to be quickly heated.

In some implementations, the transfer connector 300 includes a body part 310, a base 320, a hollow portion 330, the electric connection part 340, the guide part 350, and the heat dissipation member 360.

The body part 310 defines the body of the transfer connector 300.

The body part 310 extends in one direction, namely a vertical (or up-and-down) direction in some implementations. In some implementations, the body part 310 has a cylindrical shape with a circular cross section.

The hollow portion 330 is provided therein with the body part 310 that extends in a direction in which the body part 310 extends, namely the vertical direction in some implementations. The electric connection part 340 electrically connected to the waveguide and the antenna member is accommodated in the hollow portion 330. An inner circumferential surface of the body part 310 surrounds the hollow portion 330.

The body part 310 may be formed in a shape that may be supported on the base 320, have a space formed therein, and be connected to the waveguide.

In some implementations, the body part 310 includes an engaging protrusion 311.

The engaging protrusion 311 supports the guide part 350 disposed at the hollow portion 330 formed inside the body part 310. The engaging protrusion 311 is located at the inner circumferential surface of the body part 310, namely a surface that surrounds the hollow portion 330.

In detail, the engaging protrusion 311 protrudes radially inward from the inner circumferential surface of the body part 310. In other words, the engaging protrusion 311 extends from the inner circumferential surface of the body part 310 toward a horizontal center of the body part 310.

In some implementations, the engaging protrusion 311 may be formed in a ring shape. That is, the engaging protrusion 311 may extend at a specific height along the inner circumferential surface of the body part 310.

The engaging protrusion 311, located beneath the guide part 350, supports the guide part 350. In more detail, the engaging protrusion 311 supports a first guide portion 351 located thereon. Accordingly, the guide part 350 provided at the hollow portion 330 may be maintained in its original (or predetermined) position without being moved downward by the engaging protrusion 311.

The engaging protrusion 311 is located above a support (or supporting) protrusion 323 of the base 320 to be spaced apart from the support protrusion 323. A space is generated between the engaging protrusion 311 and the support protrusion 323. Air is accommodated in the space, so as to serve as a dielectric material.

The number and position of the engaging protrusions 311 may vary according to the number and position of the guide parts 350.

The body part 310 is connected to the waveguide. In some implementations, the body part 310 may be integrally formed with the waveguide. Accordingly, the transfer connector 300 and the waveguide may not be separated from each other. As a result, connection reliability between the transfer connector 300 and the waveguide may be improved.

The body part 310 may be made of a conductive material. In addition, the body part 310 may be made of a material having high rigidity and high thermal resistance. This is to prevent damage from external shock or high heat generated in the oven.

In some implementations, the body part 310 may be made of a steel material.

The base 320 is located beneath the body part 210. The body part 310 is supported by the base 320.

The base 320 supports the body part 310. In addition, the base 320 allows the transfer connector 300 to be coupled to the oven.

The base 320 may be provided in the form of a plate. This is to minimize a space occupied by the transfer connector 300 in the oven. In some implementations, the base 320 is formed in a square plate shape.

The base 320 may be made of a conductive material. In addition, the base 320 may be made of a material having high rigidity and high thermal resistance. This is to prevent damage from external shock or high heat generated in the oven.

In some implementations, the base 320 may be made of a steel material.

In some implementations, the base 320 is located beneath the body part 310. The base 320 may be coupled to a lower end of the body part 310. In some implementations, the base 320 may be integrally formed with the body part 310.

In some implementations, the base 320 includes a fastening member penetrating portion 321, a communication hole 322, and the support protrusion 323.

The fastening member penetrating portion 321 is formed through the base 320. The fastening member penetrating portion 321 penetrates in a thickness direction of the base 320, namely the vertical direction in some implementations.

A fastening member that allows the base 320 to be coupled to the oven is penetratingly coupled to the fastening member penetrating portion 321. In some implementations, the fastening member may be implemented as a screw or rivet.

The fastening member penetrating portion 321 is located radially outward of the body part 310. In some implementations, the fastening member penetrating portion 321 is located radially outward of the body part 310 to be adjacent to a corner of the base 320.

The fastening member penetrating portion 321 may be provided in plurality. The plurality of fastening member penetrating portions 321 may be spaced apart from each other to be located radially outward of the body part 310. In some implementations, four fastening member penetrating portions 321 are provided near the respective corners of the base 320.

The number and position of the fastening member penetrating portions 321 may vary according to a coupling structure between the transfer connector 300 and the oven.

The communication hole 322 is formed through the base 320. The communication hole 322 penetrates in a direction toward the body part 310 and a direction opposite to the body part 310, namely the vertical direction in some implementations.

The communication hole 322 communicates with the hollow portion 330 formed inside the body part 310. The communication hole 322 may be aligned with the hollow portion 330. In some implementations, the communication hole 322 may have a circular cross section corresponding to the hollow portion 330.

The electric connection part 340, which is inserted into the hollow portion 330, penetrates through the hollow portion 330 and the communication hole 322 to be connected to the antenna member provided in the oven. Accordingly, microwaves transmitted to the electric connection part 340 through the waveguide may be transferred to the antenna member.

The support protrusion 323, located beneath the guide part 350, supports the guide part 350. In more detail, the support protrusion 323 supports a second guide portion 352 located thereon. Accordingly, the guide part 350 provided at the hollow portion 330 may be maintained in its original (or predetermined) position without being moved downward by the support protrusion 323.

The support protrusion 323 protrudes radially inward from an inner circumferential surface of the base 320. That is, the support protrusion 323 may be defined as a protrusion including a surface that surrounds the communication hole 322.

Thus, a horizontal cross section of the base 320 is formed such that a diameter of the communication hole 322 provided therein is less than a diameter of the hollow portion 330.

As will be described later, the guide part 350 may have a diameter greater than or equal to the diameter of the hollow portion 330. Accordingly, the guide part 350 may be supported by the support protrusion 323.

The support protrusion 323 is located below the engaging protrusion 311 to be spaced apart from the engaging protrusion 311. Air is accommodated in a space formed between the support protrusion 323 and the engaging protrusion 311. Air may serve as a dielectric material.

The hollow portion 330 is a space to which the electric connection part 340 is penetratingly coupled.

The hollow portion 330 is provided inside the body part 310. In detail, the hollow portion 330 is formed through the body part 310. The hollow portion 330 may be defined as a space surrounded by the inner circumferential surface of the body part 310.

The hollow portion 330 extends in a direction in which the body part 310 extends, namely the vertical direction in some implementations. An upper side of the hollow portion 330 may be formed through an upper surface of the body part 310. A lower side of the hollow portion 330 may communicate with the communication hole 322 of the base 320.

The guide part 350 is disposed at the hollow portion 330. The guide part 350 is supported by the engaging protrusion 311 protruding from the inner circumferential surface of the body part 310 that surrounds the hollow portion 330.

The hollow portion 330 may have a shape that allows the electric connection part 340 to be penetratingly coupled thereto. In some implementations, the hollow portion 330 has a circular cross section and is formed in a cylindrical shape extending in the vertical direction.

The hollow portion 330 communicates with the communication hole 522. The electric connection part 340 inserted into the hollow portion 330 may extend to the communication hole 322.

The hollow portion 330 is empty except areas (or portions) in which the electric connection part 340 is accommodated and the guide part 350 is disposed. That is, air is received in the remaining area. The air accommodated in the hollow portion 330 serves as a dielectric material that provides insulation between the electric connection part 340 and the body part 310.

The electric connection part 340 is electrically connected to the external power source and the antenna member provided in the oven. That is, the electric connection part 340 provides electric connection between the external power supply source and the antenna member. Accordingly, the electric connection part 340 may transmit microwaves generated from the external power source to the antenna member.

The electric connection part 340 is coupled to the hollow portion 330 and the communication hole 322 in a penetrating manner. In some implementations, the electric connection part 340 extends to a lower side of the base 320 through the communication hole 322 by passing through an upper opening of the hollow portion 330.

An end of the electric connection part 340 exposed to an outside of the base 320, namely a lower end of the electric connection part 340 in some implementations is coupled to the antenna member. Accordingly, the electric connection part 340 and the antenna member are electrically connected to each other.

In an implementation in which the waveguide is integrally formed with the body part 310, the electric connection part 340 may extend from the waveguide. That is, unlike the illustrated implementation in which the electric connection part 340 is provided separately so as to be connected to the waveguide, the electric connection part 340 may extend directly from the waveguide in the implementation.

The electric connection part 340 may be made of a conductive material. This is to allow microwaves to smoothly travel or move between the external power outlet, the waveguide, and the antenna member. In some implementations, the electric connection part 340 may be made of a copper or brass material.

In some implementations, the electric connection part 340 has a circular cross section and extends in a direction in which the body part 310 extends, namely the vertical direction. A diameter of the cross section of the electric connection part 340 may be less than a diameter of a cross section of the hollow portion 330. Accordingly, an outer circumferential surface of the electric connection part 340 and the inner circumferential surface of the body part 310 are spaced apart from each other.

In addition, the diameter of the cross section of the electric connection part 340 may be less than a diameter of a cross section of the communication hole 322 of the base 320. Accordingly, the outer circumferential surface of the electric connection part 340 and the inner circumferential surface of the base 320 are spaced apart from each other.

Further, the diameter of the cross section of the electric connection part 340 may be less than or equal to an inner diameter of the guide part 350. Accordingly, the outer circumferential surface of the electric connection part 340 and an inner circumferential surface of the guide part 350 are in contact with each other.

The electric connection part 340 is supported by the guide part 350. That is, the outer circumferential surface of the electric connection part 340 that is penetratingly coupled to the hollow portion 330 and the communication hole 322 is brought into contact with inner circumferential surfaces of the guide portions 351 and 352 that surround penetrating portions 351*a* and 352*a*.

The outer circumferential surface of the electric connection part 340 may be coupled to the inner circumferential surface of the guide part 350. In some implementations, the outer circumferential surface of the electric connection part 340 and the inner circumferential surface of the guide part 350 may be joined together through brazing using a metal or ceramic material.

Once the electric connection part is coupled to the hollow portion 330 and the communicating hole 322, it may not be shaken or moved, thereby ensuring operational reliability of the transfer connector 300.

The guide part 350 supports the electric connection part 340 penetratingly coupled to the hollow portion 330 and the communication hole 322.

The guide part 350 may be made of an insulating material. This is to prevent electric connection between the body part 310 and the electric connection part 340.

The guide part 350 may be made of a material that may minimize damage or deformation caused by heat even in a high temperature environment. This is to prevent the guide part 350 from being damaged by heat. As the microwave oven is operated, the temperature inside the cavity increases and heat is generated accordingly. For example, the high temperature may be 500° C. or higher.

In some implementations, the guide part 350 may be made of a material that allows microwaves to pass therethrough and prevents electric connection.

For example, the guide part 350 may be made of at least one of quartz, silica, mica, and alumina materials.

The guide part 350 is provided inside the body part 310. In detail, the guide part 350 is located in the hollow portion 330 which is a space formed inside the body part 310. The guide part 350 is seated or placed on the engaging protrusion 311 formed on the inner circumferential surface of the body part 310 in a protruding manner and the support protrusion 323 of the base 320. In other words, the guide part 350 is supported by the engaging protrusion 311 and the support protrusion 323.

In some implementations, the guide part 350 is formed in a ring shape having the penetrating portions 351*a* and 352*a* formed therethrough. Alternatively, the guide part 350 is formed in a plate shape having the penetrating portions 351*a* and 352*a* formed therein. The guide part 350 may have a shape suitable for supporting the electric connection part 340.

The guide part 350 may be provided in plurality. The plurality of guide parts 350 may be spaced apart from each other. In some implementations, the guide part 350 includes the first guide portion 351 disposed at an upper position and the second guide portion 352 disposed at a lower position.

A space formed between the first guide portion 351 and the second guide portion 352 is hollow. That is, air is accommodated between the first guide portion 351 and the second guide portion 352, and a dielectric material may not be provided between the first guide portion 351 and the second guide portion 352.

The electric connection part 340 is penetratingly coupled to the first guide portion 351 and the second guide portion 352. Accordingly, the electric connection part 340 may not be brought into contact with the body part 310 or the base 320, which provides physical and electrical separation from the body part 310 or the base 320.

The first guide portion 351 is disposed in the hollow portion 330. The first guide portion 351 is located above the second guide portion 352. The first guide portion 351 is supported by the engaging protrusion 311.

An outer diameter of the first guide portion 351 may be greater than or equal to the diameter of the hollow portion 330. Accordingly, the outer diameter of the first guide portion 351 is greater than a diameter of a space surrounded by the engaging protrusion 311. This may allow the first guide portion 351 to be securely seated on the engaging protrusion 311.

In an implementation in which the outer diameter of the first guide portion 351 is greater than the diameter of the hollow portion 330, the first guide portion 351 may be fitted to the body part 310.

In some implementations, the first guide portion 351 includes the first penetrating portion 351*a*.

The first penetrating portion 351*a* is formed through the first guide portion 351. The first penetrating portion 351*a* is formed through first guide portion 351 in a direction in which the body part 310 extends, namely the vertical direction in some implementations.

A cross section of the first penetrating portion 351*a* may have a shape corresponding to a shape of the electric connection part 340. In some implementations, the electric connection part 340 has the circular cross section, and thus the cross section of the first penetrating portion 351*a* may be formed in a circular shape.

Here, a diameter of the cross section of the first penetrating portion 351*a*, namely an inner diameter of the first guide portion 351 may be less than or equal to the diameter of the cross section of the electric connection part 340. In an implementation in which a diameter of the first penetrating portion 351*a* is less than a diameter of the electric connection part 340, the electric connection part 340 may be fitted to the first penetrating portion 351*a*.

The second guide portion 352 is located in the hollow portion 330. The second guide portion 352 is located below the first guide portion 351. The second guide portion 352 is supported by the support protrusion 323.

An outer diameter of the second guide portion 352 may be greater than or equal to the diameter of the hollow portion 330. In addition, the outer diameter of the second guide portion 352 may be greater than or equal to the diameter of the communication hole 322. Accordingly, the second guide portion 352 may be securely placed on the support protrusion 323.

In an implementation in which the outer diameter of the second guide portion 352 is greater than the diameter of the hollow portion 330, the second guide portion 352 may be fitted to the body part 310.

In some implementations, the second guide portion 352 includes the second penetrating portion 352*a*.

The second penetrating portion 352*a* is formed through the second guide portion 352. The second penetrating portion 352*a* is formed through the second guide portion 352 in a direction in which the body part 310 extends, namely the vertical direction in some implementations.

A cross section of the second penetrating portion 352*a* may have a shape corresponding to the shape of the electric connection part 340. In some implementations, the electric connection part 340 has the circular cross section, and thus, the cross section of the second penetrating portion 352*a* may be formed in a circular shape.

Here, a diameter of the cross section of the second penetrating portion 352*a*, namely an inner diameter of the second guide portion 352 may be less than or equal to the diameter of the cross section of the electric connection part 340. In an implementation in which a diameter of the second penetrating portion 352*a* is less than the diameter of the electric connection part 340, the electric connection part 340 may be fitted to the second penetrating portion 352*a*.

Heat, generated when the oven is operated, is transmitted to the transfer connector 300, and the heat is discharged to the outside by the heat dissipation member 360. This allows the transfer connector 300 to be rapidly cooled, thereby preventing damage caused by the heat generated in the oven.

The heat dissipation member 360 is provided at the body part 310. In detail, the heat dissipation member 360 extends radially outward from an outer circumferential surface of the body part 310. In some implementations, the heat dissipation member 360 may be integrally formed with the body part 310.

The heat dissipation member 360 may have a shape that may increase a contact area with external air, or the like. In some implementations, the heat dissipation member 360 has a plate shape with a circular cross section.

The heat dissipation member 360 may be made of a material having a high thermal conductivity coefficient. This is to effectively dissipate heat generated as the oven is operated. In some implementations, the heat dissipation member 360 may be made of copper (Cu).

The heat dissipation member 360 may be provided in plurality. The plurality of heat dissipation members 360 may be stacked to be apart from one another in a direction that the body part 310 extends, namely the vertical direction in some implementations.

In some implementations, six heat dissipation members 360 are provided to be spaced apart from one another in the vertical direction, so as to be respectively coupled to the body part 310. The number and arrangement (or placement) of the heat dissipation members 360 may vary according to a shape of the body part 310 and a level of heat dissipation.

A coupling hole 361 is formed inside the heat dissipation member 360. The coupling hole 361 is formed through the heat dissipation member 360 in a direction in which the body part 310 extends, namely the vertical direction in some implementations.

The body part 310 is penetrating coupled to the coupling hole 361. The outer circumferential surface of the body part 310 may be brought into contact with an inner circumferential surface of the heat dissipation member 360 that surrounds the coupling hole 361. In some implementations, the outer circumferential surface of the body part 310 and the inner circumferential surface of the heat dissipation member 360 may be joined together through brazing. Alternatively, the body part 310 may be fitted to the coupling hole 361.

In some examples, the transfer connector 300 may not include a dielectric material that provides insulation between the body part 310 and the electric connection part 340.

The electric connection part 340 is accommodated in the hollow portion 330 formed inside the body part 310. The electric connection part 340 is spaced apart from the inner circumferential surface of the body part 310, namely a surface that surrounds the hollow portion 330. Thus, the electric connection part 340 and the body part 310 are not electrically connected to each other.

The electric connection part 340 is supported by the guide part 350. The guide part 350 is provided in plurality, so as to respectively support upper and lower sides of the electric connection part 340, which is penetratingly coupled to the hollow portion 330. Each of the penetrating portions 351*a* and 352*a* provided in the respective guide portions 351 and 352 has a diameter less than or equal to the diameter of the cross section of the electric connection part 340. This prevents the inserted electric connection part 340 from being shaken or moved.

When the oven is operated at a high temperature of 250° C. or higher, damage to a dielectric material may occur. In order to prevent this, the dielectric material, which may be damaged by the high temperature, may not be provided in the transfer connector 300.

Accordingly, the body part 310, the base 320, and the electric connection part 340 may be securely coupled to one another.

Further, heat generated in the oven is transferred to the heat dissipation member 360 through the base 320 and the body part 310. The heat transmitted to the heat dissipation member 360 is emitted to the outside, thereby quickly cooling the transfer connector 300. Accordingly, in the transfer connector 300, heat generated in the oven may be quickly discharged.

As a result, reliability of electric connection between the antenna member and the external power source is increased. Thus, operational reliability of the oven equipped with the transfer connector 300 may be improved.

In some implementations, the transfer connector 400 may include a dielectric material 450 having high thermal resistance. For instance, when temperature inside a cavity of an oven at which the transfer connector 400 is provided rises to a high temperature, damage to the dielectric material 450 may be prevented or reduced.

In addition, thermal resistance of the transfer connector 400 may be improved, thereby ensuring insulation between each of the components constituting the transfer connector 400. Further, an electric connection part 440 supported by the dielectric material 450 may be held securely in a predetermined position.

In some examples, the transfer connector 400 may include a heat dissipation member 460 for dissipating heat generated in the oven. Accordingly, heat, generated when the oven is operated, may be quickly and effectively dissipated.

As a result, damage to the transfer connector 400 due to heat generated in the oven may be prevented.

In some implementations, the transfer connector 400 may be integrally formed with a waveguide. Accordingly, the transfer connector 400 and the waveguide are not separated from each other. As a result, an external power source and the transfer connector 400 may be securely connected to each other.

Figure 11:
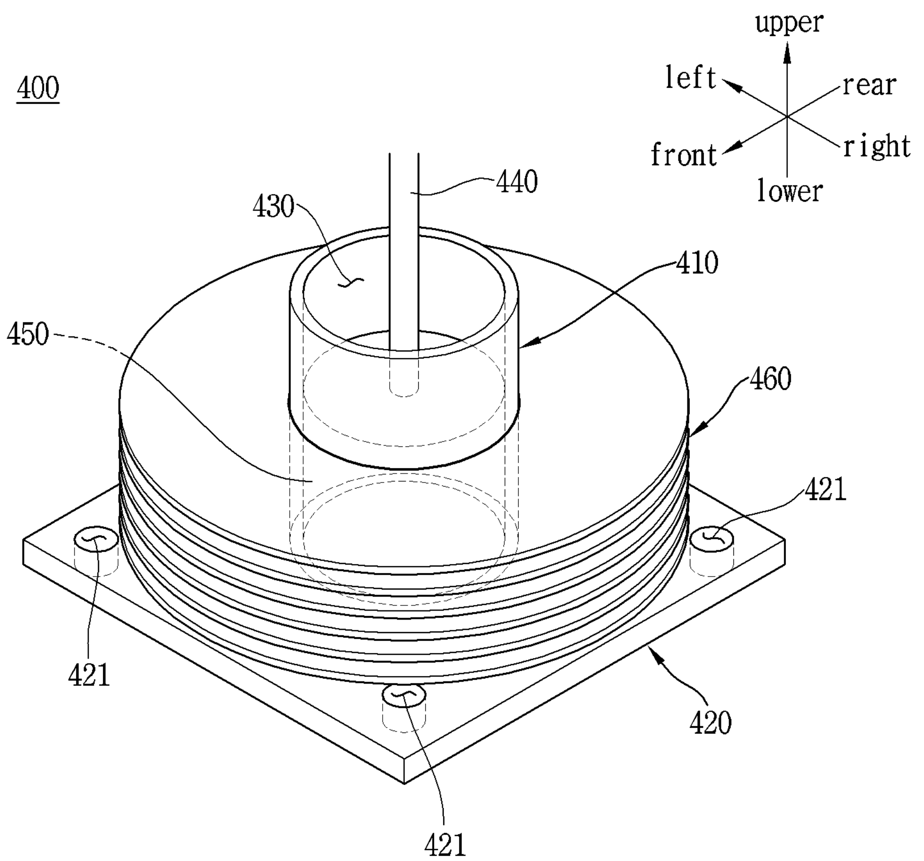
FIG. 11 is a perspective view illustrating an example connector.
Figure 12:
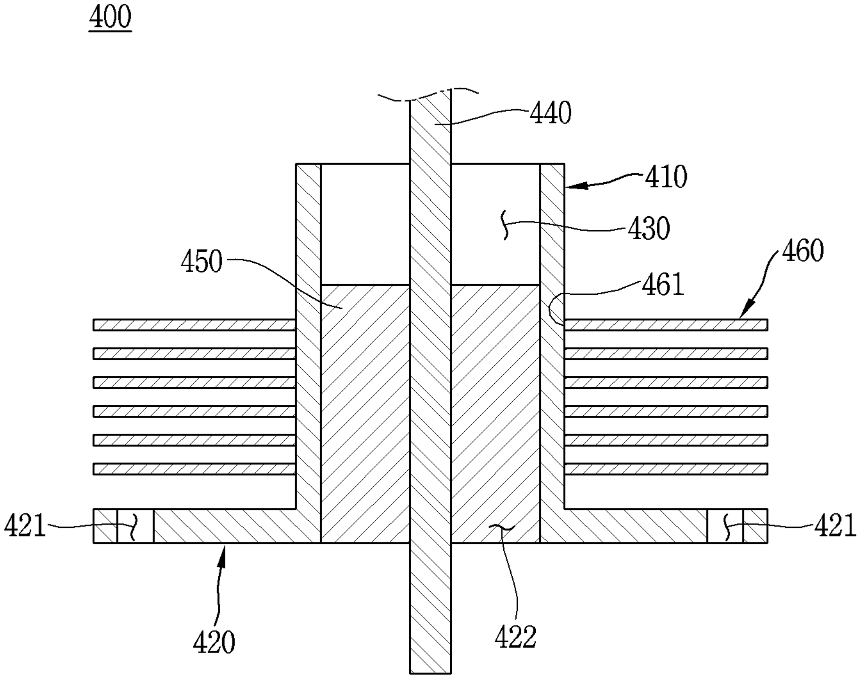
FIG. 12 is a cross-sectional view of the connector FIG. 11.

Hereinafter, the transfer connector 400 will be described with reference to FIGS. 11 and 12.

The transfer connector 400 is coupled to the oven. In some implementations, the transfer connector 400 may be provided at an upper side of the oven.

The transfer connector 400 is connected to the external power source through the waveguide. Microwaves generated from the external power source may be transmitted to the transfer connector 400 through the waveguide.

The transfer connector 400 is connected to an antenna member provided at a cavity of the oven. The microwaves transmitted to the transfer connector 400 may be emitted or radiated into the cavity via the antenna member.

Accordingly, the microwaves may be incident on food accommodated in the cavity in various directions. This allows the food to be quickly heated.

In some implementations, the transfer connector 400 includes a body part 410, a base 420, a hollow portion 430, the electric connection part 440, the dielectric material 450, and the heat dissipation member 460.

The body part 410 defines the body of the transfer connector 400.

The body part 410 extends in one direction, namely a vertical (or up-and-down) direction in some implementations. In some implementations, the body part 410 has a cylindrical shape with a circular cross section.

The hollow portion 430 is provided therein with the body part 410 that extends in a direction in which the body part 110 extends, namely the vertical direction in some implementations. The electric connection part 440 electrically connected to the waveguide and the antenna member is accommodated in the hollow portion 430. An inner circumferential surface of the body part 410 surrounds the hollow portion 430.

The body part 410 may be formed in a shape that may be supported on the base 420, have a space formed therein, and be connected to the waveguide.

The body part 410 is connected to the waveguide. In some implementations, the body part 410 may be integrally formed with the waveguide. Accordingly, the transfer connector 400 and the waveguide may not be separated from each other. As a result, connection reliability between the transfer connector 400 and the waveguide may be improved.

The body part 410 may be made of a conductive material. In addition, the body part 410 may be made of a material having high rigidity and high heat thermal resistance. This is to prevent damage from external shock or high heat generated in the oven.

In some implementations, the body part 410 may be made of a steel material.

The base 420 is located beneath the body part 410. The body part 410 is supported by the base 420.

The base 420 supports the body part 410. In addition, the base 420 allows the transfer connector 400 to be coupled to the oven.

The base 420 may be provided in the form of a plate. This is to minimize a space occupied by the transfer connector 400 in the oven. In some implementations, the base 420 is formed in a square plate shape.

The base 420 may be made of a conductive material. In addition, the base 420 may be made of a material having high rigidity and high heat resistance. This is to prevent damage from external shock or high heat generated in the oven.

In some implementations, the base 420 may be made of a steel material.

In some implementations, the base 420 is located beneath the body part 410. The base 420 may be coupled to a lower end of the body part 410. In some implementations, the base 420 may be integrally formed with the body part 410.

In some implementations, the base 420 includes a fastening member penetrating portion 421 and a communication hole 422.

The fastening member penetrating portion 421 is formed through the base 420. The fastening member penetrating portion 421 penetrates in a thickness direction of the base 420, namely the vertical direction in some implementations.

A fastening member that allows the base 420 to be coupled to the oven is penetratingly coupled to the fastening member penetrating portion 421. In some implementations, the fastening member may be configured as a screw or rivet.

The fastening member penetrating portion 421 is located radially outward of the body part 410. In some implementations, the fastening member penetrating portion 421 is located radially outward of the body part 410 to be adjacent to a corner of the base 420.

The fastening member penetrating portion 421 may be provided in plurality. The plurality of fastening member penetrating portions 421 may be spaced apart from each other to be located radially outward of the body part 410. In some implementations, four fastening member penetrating portions 421 are provided near the respective corners of the base 420.

The number and position of the fastening member penetrating portions 421 may vary according to a coupling structure between the transfer connector 400 and the oven.

The communication hole 422 is formed through the base 420. The communication hole 422 penetrates in a direction toward the body part 410 and a direction opposite to the body part 410, namely the vertical direction in some implementations.

The communication hole 422 communicates with the hollow portion 430 formed inside the body part 410. The communication hole 422 may be aligned with the hollow portion 430. In some implementations, the communication hole 422 may have a circular cross section corresponding to the hollow portion 430.

The electric connection part 440, which is inserted into the hollow portion 430, penetrates through the hollow portion 430 and the communication hole 422 to be connected to the antenna member provided in the oven. Accordingly, microwaves transmitted to the electric connection part 440 through the waveguide may be transferred to the antenna member.

The hollow portion 430 is a space to which the electric connection part 440 is coupled. In addition, the hollow portion 430 may be partially filled with the dielectric material 450.

The hollow portion 430 is provided inside the body part 410. In detail, the hollow portion 430 is formed through the body part 410. The hollow portion 430 may be defined as a space surrounded by the inner circumferential surface of the body part 410.

The hollow portion 430 extends in a direction in which the body part 410 extends, namely the vertical direction in some implementations. An upper side of the hollow portion 430 may be formed through an upper surface of the body part 410. A lower side of the hollow portion 430 may communicate with the communication hole 422 of the base 420.

The hollow portion 430 may have a shape that allows the electric connection part 440 to be penetratingly coupled thereto and the dielectric material 450 to be partially filled therein. In some implementations, the hollow portion 430 has a circular cross section and is formed in a cylindrical shape extending in the vertical direction.

The electric connection part 440 is electrically connected to the external power source and the antenna member provided in the oven. That is, the electric connection part 440 provides electric connection between the external power source and the antenna member. Accordingly, the electric connection part 440 may transmit microwaves generated from the external power source to the antenna member.

The electric connection part 440 is coupled to the hollow portion 430 and the communication hole 422 in a penetrating manner. In some implementations, the electric connection part 440 extends to a lower side of the base 420 through the communication hole 422 by passing through an upper opening of the hollow portion 430.

An end of the electric connection part 440 exposed to an outside of the base 420, namely a lower end of the electric connection part 440 in some implementations is coupled to the antenna member. Accordingly, the electric connection part 440 and the antenna member are electrically connected to each other.

In an implementation in which the waveguide is integrally formed with the body part 410, the electric connection part 440 may extend from the waveguide. That is, unlike the illustrated implementation in which the electric connection part 440 is provided separately so as to be connected to the waveguide, the electric connection part 440 may extend directly from the waveguide in the implementation.

The electric connection part 440 may be made of a conductive material. This is to allow microwaves to smoothly move between the external power source, the waveguide, and the antenna member. In some implementations, the electric connection part 440 may be made of a copper or brass material.

In some implementations, the electric connection part 440 has a circular cross section and extends in a direction in which the body part 410 extends, namely the vertical direction. A diameter of the cross section of the electric connection part 440 may be less than that of the hollow portion 430 and the communication hole 422.

Accordingly, an outer circumferential surface of the electric connection part 440, the inner circumferential surface of the body part 410, and an inner circumferential surface of the base 420 are spaced apart from one another. The dielectric material 450 is partially filled in a space generated therebetween.

The electric connection part 440 is supported by the dielectric material 450. That is, the outer circumferential surface of the electric connection part 440, which is penetratingly coupled to the hollow portion 430 and the communication hole 422, is surrounded by the dielectric material 450.

Once the electric connection part 440 is coupled to the hollow portion 430 and the communication hole 422, it may not be shaken or moved, thereby ensuring operational reliability of the transfer connector 400.

The dielectric material 450 prevents electric connection between the body part 410 and the electric connection part 440. In addition, the dielectric material 450 supports the electric connection part 440 that is inserted into the hollow portion 430 and the communication hole 422.

The dielectric material 450 may be made of an insulating material. This is to prevent electric connection between the body part 410 and the electric connection part 440.

The dielectric material 450 may be made of a material that may minimize damage or deformation caused by heat in a high temperature environment. This is to prevent the dielectric material 450 from being damaged by heat. As the microwave oven is operated, the temperature inside the cavity increases and heat is generated accordingly. For example, the high temperature may be 500° C. or higher.

In some implementations, the dielectric material 450 may be made of at least one of quartz, silica, mica, and alumina materials.

The dielectric material 450 is disposed at the hollow portion 430 and the communication hole 422. In detail, the dielectric material 450 extends from one point of the hollow portion 430 to the communication hole 422. In some implementations, the dielectric material 450 extends from a height of ⅔ of the hollow portion 430 to the communication hole 422.

The dielectric material 450 is located radially outward of the electric connection part 440. The dielectric material 450 surrounds the outer circumferential surface of the electric connection part 440. The dielectric material 450 is coupled to the outer circumferential surface of the electric connection part 440, so as to surround the electric connection part 440. The dielectric material 450 may be coupled to the outer circumferential surface of the electric connection part 440.

The dielectric material 450 is located radially inward of inner circumferential surfaces of the body part 410 and the communication hole 422. Each of the inner circumferential surfaces of the body part 410 and the communication hole 422 surrounds the dielectric material 450. The dielectric material 450 may be coupled to each of the inner circumferential surfaces of the body part 410 and the communication hole 422.

In other words, the inner circumferential surfaces of the body part 410 and the communication hole 422 are located radially outward of the dielectric material 450. In addition, the electric connection part 440 is located radially inward of the dielectric material 450.

The dielectric material 450 is coupled to each of the inner circumferential surfaces of the body part 410 and the base 420. Accordingly, the dielectric material 450 may not be moved inside the hollow portion 430 and the communication hole 422.

In some implementations, the dielectric material 450 and each of the inner circumferential surfaces of the body part 410 and the base 420 are joined together through brazing using a metal or ceramic material.

The dielectric material 450 is coupled to the outer circumferential surface of the electric connection part 440. Accordingly, the electric connection part 440 may not be moved inside the hollow portion 430 and the communication hole 422.

In some implementations, the dielectric material 450 and the outer circumferential surface of the electric connection part 440 may be joined together through brazing using a metal or ceramic material.

Heat, generated when the oven, is transmitted to the transfer connector 400, and the heat is discharged to the outside by the heat dissipation member 460. This allows the transfer connector 400 to be rapidly cooled, thereby preventing damage caused by heat generated in the oven.

The heat dissipation member 460 is provided at the body part 410. In detail, the heat dissipation member 460 extends radially outward from an outer circumferential surface of the body part 410. In some implementations, the heat dissipation member 460 may be integrally formed with the body part 410.

The heat dissipation member 460 may have a shape that may increase a contact area with external air, or the like. In some implementations, the heat dissipation member 460 is formed in a plate shape having a circular cross section.

The heat dissipation member 460 may be made of a material having a high thermal conductivity coefficient. This is to effectively dissipate heat generated as the oven is operated. In some implementations, the heat dissipation member 460 may be made of copper (Cu).

The heat dissipation member 460 may be provided in plurality. The plurality of heat dissipation members 460 may be stacked to be spaced apart from one another in a direction that the body part 410 extends, namely the vertical direction in some implementations.

In some implementations, six heat dissipation members 460 are provided to be spaced apart from one another in the vertical direction of the body part 410, so as to be respectively coupled to the body part 410. The number and arrangement of the heat dissipation members 460 may vary according to a shape of the body part 410 and a level of heat dissipation.

A coupling hole 461 is formed inside the heat dissipation member 460. The coupling hole 461 is formed through the heat dissipation member 460 in an extending direction of the body part 410, namely the vertical direction in some implementations.

The body part 410 is penetratingly coupled to the coupling hole 461. The outer circumferential surface of the body part 410 may be brought into contact with an inner circumferential surface of the heat dissipation member 460 that surrounds the coupling hole 461. In some implementations, the outer circumferential surface of the body part 410 and the inner circumferential surface of the heat dissipation member 460 may be joined together through brazing. Alternatively, the body part 410 may be fitted to the coupling hole 461.

In some examples, the transfer connector 400 may include the dielectric material 450 with high heat resistance.

The dielectric material 450 is filled in the hollow portion 430 and the communication hole 422. The dielectric material 450 is coupled to the inner circumferential surface of the body part 410 that surrounds the hollow portion 430 and the inner circumferential surface of the base 420 that surrounds the communication hole 422. In addition, the electric connection part 440 is accommodated in the dielectric material 450. The dielectric material 450 is coupled to the outer circumferential surface of the electric connection part 440.

In some examples, when the oven provided with the transfer connector 400 is operated at a high temperature of 250° C. or higher, damage to the dielectric material 450 may be prevented or reduced. This may allow the dielectric material 450, the body part 410, the base 420, and the electric connection part 440 to be securely coupled to one another.

Further, heat generated in the oven is transferred to the heat dissipation member 460 through the base 420 and the body part 410. The heat transmitted to the heat dissipation member 460 is emitted to the outside, thereby quickly cooling the transfer connector 400. Accordingly, in the transfer connector 400, heat generated in the oven may be quickly discharged.

As a result, reliability of electric connection between the antenna member and the external power source is increased. Thus, operational reliability of the oven equipped with the transfer connector 400 may be improved.

In some implementations, the transfer connector 500 may not include a dielectric material, and instead air may be used as a dielectric material. Accordingly, even when temperature inside a cavity of an oven at which the transfer connector 500 is provided rises to a high temperature, structural deformation of the transfer connector 500 may be minimized.

In addition, thermal resistance of the transfer connector 500 may be improved, thereby ensuring insulation between each of the components constituting the transfer connector 500. Further, an electric connection part 540 supported by a guide part 550 may be held securely in a predetermined position.

In some implementations, the transfer connector 500 may include a heat dissipation member 560 for dissipating heat generated in an oven. Accordingly, heat generated when the oven is operated may be quickly and effectively dissipated.

As a result, damage to the transfer connector 500 due to heat generated in the oven may be prevented.

In some implementations, the transfer connector 500 may be integrally formed with a waveguide. Accordingly, the transfer connector 500 and the waveguide are not separated from each other. As a result, an external power source and the transfer connector 500 may be securely connected to each other.

Figure 13:
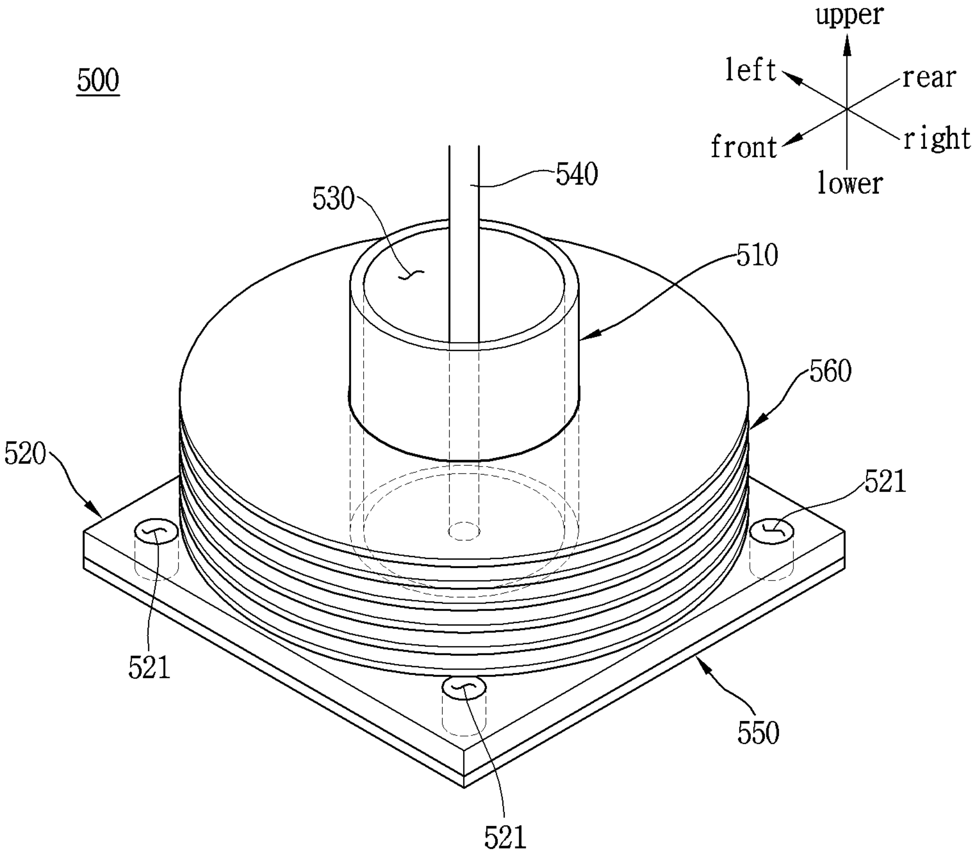
FIG. 13 is a perspective view illustrating an example connector.
Figure 14:
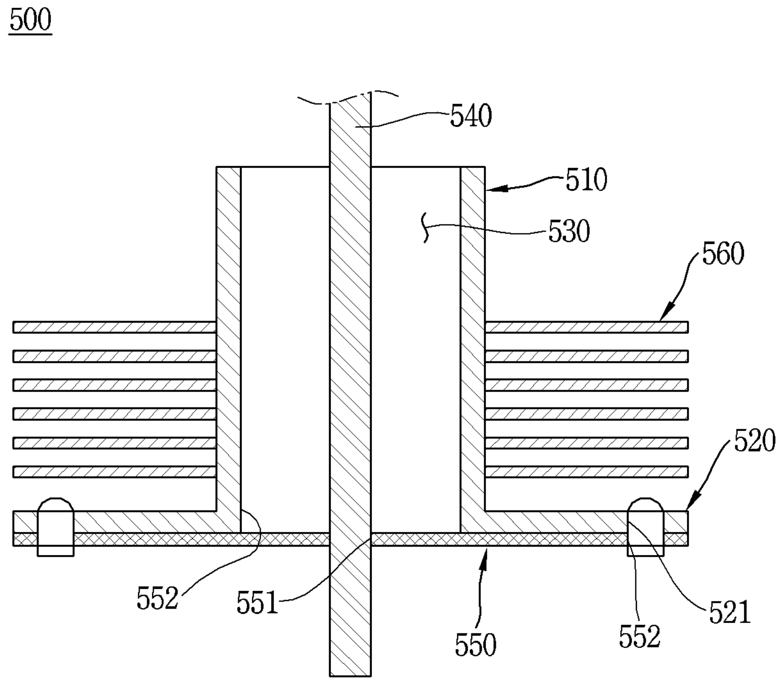
FIG. 14 is a cross-sectional view of the connector of FIG. 13.

Hereinafter, the transfer connector 500 will be described with reference to FIGS. 13 to 14.

The transfer connector 500 is coupled to the oven. In some implementations, the transfer connector 500 may be provided at an upper side of the oven.

The transfer connector 500 is connected to the external power source through the waveguide. Microwaves generated from the external power source may be transmitted to the transfer connector 500 through the waveguide.

The transfer connector 500 is connected to an antenna member provided at a cavity of the oven. The microwaves transmitted to the transfer connector 500 may be emitted or radiated into the cavity via the antenna member.

Accordingly, the microwaves may be incident on food accommodated in the cavity in various directions. This allows the food to be quickly heated.

In some implementations, the transfer connector 500 includes a body part 510, a base 520, a hollow portion 530, the electric connection part 540, the guide part 550, and the heat dissipation member 560.

The body part 510 defines the body of the transfer connector 500.

The body part 510 extends in one direction, namely a vertical (or up-and-down) direction in some implementations. In some implementations, the body part 510 has a cylindrical shape with a circular cross section.

The hollow portion 530 is provided therein with the body part 510 that extends in a direction in which the body part 510 extends, namely the vertical direction in some implementations. The electric connection part 540 electrically connected to the waveguide and the antenna member is accommodated in the hollow portion 530. An inner circumferential surface of the body part 510 surrounds the hollow portion 530.

The body part 510 may be formed in a shape that may be supported on the base 520, have a space formed therein, and be connected to the waveguide.

The body part 510 is connected to the waveguide. In some implementations, the body part 510 may be integrally formed with the waveguide. Accordingly, the transfer connector 500 and the waveguide may not be separated from each other. As a result, connection reliability between the transfer connector 500 and the waveguide may be improved.

The body part 510 may be made of a conductive material. In addition, the body part 510 may be made of a material having high rigidity and high thermal resistance. This is to prevent damage from external shock or high heat generated in the oven.

In some implementations, the body part 510 may be made of a steel material.

The base 520 is located beneath the body part 510. The body part 510 is supported by the base 520.

The base 520 supports the body part 510. In addition, the base 520 allows the transfer connector 500 to be coupled to the oven.

The base 520 may be provided in the form of a plate. This is to minimize a space occupied by the transfer connector

500 in the oven. In some implementations, the base 520 is formed in a square plate shape.

The base 520 may be made of a conductive material. In addition, the base 520 may be made of a material having high rigidity and high thermal resistance. This is to prevent damage from external shock or high heat generated in the oven.

In some implementations, the base 520 may be made of a steel material.

In some implementations, the base 520 is located beneath the body part 510. The base 520 may be coupled to a lower end of the body part 510. In some implementations, the base 520 may be integrally formed with the body part 510.

In some implementations, the base 520 includes a fastening member penetrating portion 521 and a communication hole 522.

The fastening member penetrating portion 521 is formed through the base 520. The fastening member penetrating portion 521 penetrates in a thickness direction of the base 520, namely the vertical direction in some implementations.

A fastening member that allows the base 520 to be coupled to the oven is penetratingly coupled to the fastening member penetrating portion 521. In some implementations, the fastening member may be configured as a screw or rivet.

The fastening member penetrating portion 521 is located radially outward of the body part 510. In some implementations, the fastening member penetrating portion 521 is located radially outward of the body part 510 to be adjacent to a corner of the base 520.

The fastening member penetrating portion 521 may be provided in plurality. The plurality of fastening member penetrating portions 521 may be spaced apart from each other to be located radially outward of the body part 510. In some implementations, four fastening member penetrating portions 521 are provided near the respective corners of the base 520.

The number and position of the fastening member penetrating portions 521 may vary according to a coupling structure between the transfer connector 500 and the oven.

The communication hole 522 is formed through the base 520. The communication hole 522 penetrates in direction toward the body part 510 and a direction opposite to the body part 510, namely the vertical direction in some implementations.

The communication hole 522 communicates with the hollow portion 530 formed inside the body part 510. The communication hole 522 may be aligned with the hollow portion 530. In some implementations, the communication hole 522 may have a circular cross section corresponding to the hollow portion 530.

The electric connection part 540, which is inserted into the hollow portion 530, penetrates through the hollow portion 530 and the communication hole 522 to be connected to the antenna member provided in the oven. Accordingly, microwaves transmitted to the electric connection part 540 through the waveguide may be transferred to the antenna member.

The hollow portion 530 is a space to which the electric connection part 540 is penetratingly coupled.

The hollow portion 530 is provided inside the body part 510. In detail, the hollow portion 530 is formed through the body part 510. The hollow portion 530 may be defined as a space surrounded by the inner circumferential surface of the body part 510.

The hollow portion 530 extends in a direction in which the body part 510 extends, namely the vertical direction in some implementations. An upper side of the hollow portion 530 may be formed through an upper surface of the body part 510. A lower side of the hollow portion 530 may communicate with the communication hole 522 of the base 520.

The hollow portion 530 may have a shape that allows the electric connection part 540 to be penetratingly coupled thereto. In some implementations, the hollow portion 530 has a circular cross section and is formed in a cylindrical shape extending in the vertical direction.

The hollow portion 530 communicates with the communication hole 522. The electric connection part 540 inserted into the hollow portion 530 may extend to the communication hole 522.

The hollow portion 530 is empty except an area (or portion) in which the electric connection part 540 is accommodated. That is, air is received in the remaining area. The air accommodated in the hollow portion 530 serves as a dielectric material that provides insulation between the electric connection part 540 and the body part 510.

The electric connection part 540 is electrically connected to the external power source and the antenna member provided in the oven. That is, the electric connection part 540 provides electric connection between the external power source and the antenna member. Accordingly, the electric connection part 540 may transmit microwaves generated from the external power source to the antenna member.

The electric connection part 540 is coupled to the hollow portion 530 and the communicating hole 522 in a penetrating manner. In some implementations, the electric connection part 540 extends to a lower side of the base 520 through the communication hole 522 by passing through an upper opening of the hollow portion 530.

An end of the electric connection part 540 exposed to an outside of the base 520, namely a lower end of the electric connection part 540 in some implementations is coupled to the antenna member. Accordingly, the electric connection part 540 and the antenna member are electrically connected to each other.

In an implementation in which the waveguide is integrally formed with the body part 510, the electric connection part 540 may extend from the waveguide. That is, unlike the illustrated implementation in which the electric connection part 540 is provided separately so as to be connected to the waveguide, the electric connection part 540 may extend directly from the waveguide in the implementation.

The electric connection part 540 may be made of a conductive material. This is to allow microwaves to smoothly travel or move between the external power source, the waveguide, and the antenna member. In some implementations, the electric connection part 540 may be made of a copper or brass material.

In some implementations, the electric connection part 540 has a circular cross section and extends in a direction in which the body part 510 extends, namely the vertical direction. A diameter of the cross section of the electric connection part 540 may be less than a diameter of a cross section of the hollow portion 530. Accordingly, an outer circumferential surface of the electric connection part 540 and the inner circumferential surface of the body part 510 are spaced apart from each other.

In addition, the diameter of the cross section of the electric connection part 540 may be less than a diameter of a cross section of the communication hole 522 of the base 520. Accordingly, the outer circumferential surface of the electric connection part 540 and an inner circumferential surface of the base 520 are also spaced apart from each other.

Further, the diameter of the cross section of the electric connection part 540 may be equal to a diameter of a cross section of a first penetrating portion 551 of the guide part 550. Accordingly, the outer circumferential surface of the electric connection part 540 and an inner circumferential surface of the guide part 550 are in contact with each other.

The electric connection part 540 may be supported by the guide part 550. That is, the outer circumferential surface of the electric connection part 540, which is penetratingly coupled to the hollow portion 530 and the communication hole 522, may be brought into contact with the inner circumferential surface of the guide part 550 that surrounds the first penetrating portion 551 formed therein.

The outer circumferential surface of the electric connection part 540 may be coupled to the inner circumferential surface of the guide part 550. In some implementations, the outer circumferential surface of the electric connection part 540 and the inner circumferential surface of the guide part 550 may be joined together through brazing using a metal or ceramic material.

Once the electric connection part 540 is penetratingly coupled to the hollow portion 530 and the communication hole 522, it may not be shaken or moved, thereby ensuring operational reliability of the transfer connector 500.

The guide part 550 supports the base 520. In addition, the guide part 550 supports the electric connection part 540 penetratingly coupled to the hollow portion 530 and the communication hole 522.

The guide part 550 may be made of an insulating material. This is to prevent electric connection between the body part 510 and the electric connection part 540.

The guide part 550 may be made of a material that may minimize damage or deformation caused by heat even in a high temperature environment. This is to prevent the guide part 550 from being damaged by heat. As the microwave oven is operated, the temperature inside the cavity increases and heat is generated accordingly. For example, the high temperature may be 500° C. or higher.

In some implementations, the guide part 550 may be made of a material that allows microwaves to pass therethrough and prevents electric connection.

For example, the guide part 550 may be made of at least one of quartz, silica, mica, and alumina materials.

The guide part 550 supports the base 520. In some implementations, the guide part 550 is located beneath the base 520. The guide part 550 is coupled to a lower surface of the base 520.

The guide part 550 may have a shape suitable for being coupled to the base 520. In some implementations, the guide part 550 is formed in a square plate shape corresponding to the base 520. The shape of the guide part 550 may vary according to the shape of the base 520.

The guide part 550 is coupled to the base 520. In detail, surfaces that the guide part 550 and the base 520 face each other may be coupled to be in close contact with each other.

In some implementations, the surfaces that the guide part 550 and the base 520 face each other may be joined together through brazing using a metal or ceramic material.

In some implementations, the guide part 550 includes the first penetrating portion 551 and a second penetrating portion 552.

The first penetrating portion 551 is a space to which the electric connection part 540 is penetratingly coupled. The first penetrating portion 551 is formed through the guide part 550. The electric connection part 540 penetratingly coupled to the hollow portion 530 may extend to the first penetrating portion 551, so as to be coupled to the antenna member.

The first penetrating portion 551 communicates with the communication hole 522 and the hollow portion 530. The electric connection part 540 inserted into the hollow portion 530 may be inserted into the communication hole 522 and the first penetrating portion 551.

The first penetrating portion 551 extends in a direction in which the body part 510 extends, namely the vertical direction in some implementations.

The first penetrating portion 551 communicates with the hollow portion 530. The electric connection part 540 penetratingly coupled to the hollow portion 530 may extend to the first penetrating portion 551.

The first penetrating portion 551 is disposed to overlap the hollow portion 530. In some implementations, the first penetrating portion 551 may be disposed to have the same central axis as the hollow portion 530.

In some implementations, the first penetrating portion 551 has a circular cross section. A diameter of the first penetrating portion 551 may be less than or equal to a diameter of the electric connection part 540. In an implementation in which the diameter of the first penetrating portion 551 is less than the diameter of the electric connection part 540, the electric connection part 540 may be fitted to the first penetrating portion 551.

A surface that surrounds the first penetrating portion 551, namely the inner circumferential surface of the guide part 550 may be coupled to the outer circumferential surface of the electric connection part 540.

In some implementations, the inner circumferential surface of the guide part 550 and the outer circumferential surface of the electric connection part 540 may be joined together through brazing using a metal or ceramic material.

This allows to prevent the electric connection part 540 penetratingly coupled to the first penetrating portion 551 from being moved vertically or horizontally.

The second penetrating portion 552 is a space to which the fastening member that allows the guide part 550 and the base 520 to be coupled to each other is penetratingly coupled.

The fastening member may be penetratingly coupled to the second penetrating portion 552 and the fastening member penetrating portion 521. The second penetrating portion 552 communicates with the fastening member penetrating portion 521.

The second penetrating portion 552 is formed through the guide part 550. The second penetrating portion 552 is located radially outward of the first penetrating portion 551.

The second penetrating portion 552 may be provided in plurality. The plurality of second penetrating portions 552 may be spaced apart from one another. In some implementations, four second penetrating portions 552 are provided to be located adjacent to the respective corners of the guide part 550.

The second penetrating portion 552 may overlap the fastening member penetrating portion 521. The second penetrating portion 552 may be disposed to have the same central axis as the fastening member penetrating portion 521.

In some implementations, the second penetrating portion 552 may have a diameter of its cross section equal to a diameter of a cross section of the fastening member penetrating portion 521, and have a circular shape with the same central axis as the fastening member penetrating portion 521.

Heat, generated when the oven is operated, is transmitted to the transfer connector 500, and the heat is discharged to the outside by the heat dissipation member 560. This allows the transfer connector 500 to be rapidly cooled, thereby preventing damage caused by heat generated in the oven.

The heat dissipation member 560 is provided at the body part 510. In detail, the heat dissipation member 560 extends radially outward from an outer circumferential surface of the body part 510. In some implementations, the heat dissipation member 560 may be integrally formed with the body part 510.

The heat dissipation member 560 may have a shape suitable for increasing an area in contact with external air, or the like. In some implementations, the heat dissipation member 560 has a plate shape with a circular cross section.

The heat dissipation member 560 may be made of a material having a high thermal conductivity coefficient. This is to effectively dissipate heat generated and transferred as the oven is operated. In some implementations, the heat dissipation member 560 may be made of copper (Cu).

The heat dissipation member 560 may be provided in plurality. The plurality of heat dissipation members 560 may be stacked to be spaced apart from one another in a direction that the body part 510 extends, namely the vertical direction in some implementations.

In some implementations, six heat dissipation members 560 are provided to be spaced apart from one another in the vertical direction, so as to be respectively coupled to the body part 510. The number and arrangement of the heat dissipation members 560 may vary according to a shape of the body part 510 and a level of heat dissipation.

A coupling hole 561 is provided inside the heat dissipation member 560. The coupling hole 561 is formed through the heat dissipation member 560 in a direction in which the body part 510 extends, namely the vertical direction in some implementations.

The body part 510 is penetratingly coupled to the coupling hole 561. The outer circumferential surface of the body part 510 may be brought into contact with an inner circumferential surface of the heat dissipation member 560 that surrounds the coupling hole 561. In some implementations, the outer circumferential surface of the body part 510 and the inner circumferential surface of the heat dissipation member 560 may be joined together through brazing. Alternatively, the body part 510 may be fitted to the coupling hole 561.

In some examples, the transfer connector 500 may not include a dielectric material that provides insulation between the body part 510 and the electric connection part 540.

The electric connection part 540 is accommodated in the hollow portion 530 formed inside the body part 510. The electric connection part 540 is spaced apart from the inner circumferential surface of the body part 510, namely a surface that surrounds the hollow portion 530. This prevents electric connection between the electric connection part 540 and body part 510.

A lower side of the electric connection part 540 is supported by the guide part 550. That is, the lower side of the electric connection part 540 is inserted into the first penetrating portion 551 formed through the guide part 550. The first penetrating portion 551 is formed such that its diameter is less than or equal to the diameter of the cross section of the electric connection part 540, and thus the inserted electric connection part 540 may not be shaken or moved.

When the oven is operated at a high temperature of 250° C. or higher, damage to a dielectric material may occur. In order to prevent this, the dielectric material, which may be damaged by the high temperature, may not be provided in the transfer connector 500.

Accordingly, the body part 510, the base 520, and the electric connection part 540 may be securely coupled to one another.

Further, heat generated in the oven is transferred to the heat dissipation member 560 through the base 520 and the body part 510. The heat transmitted to the heat dissipation member 560 is emitted to the outside, thereby quickly cooling the transfer connector 500. Accordingly, in the transfer connector 500, heat generated in the oven may be quickly discharged.

As a result, reliability of electric connection between the antenna member and the external power source is increased. Therefore, operational reliability of the oven equipped with the transfer connector 500 may be improved.

It should be understood that the detailed description and specific examples are given by way of illustration only, since various changes and modifications within the scope of the disclosure will be apparent to those skilled in the art.

What is claimed is:

1. A transfer connector for a cooking appliance, comprising:

a body that extends in a first direction and defines a hollow portion therein;

a base that is coupled to the body and defines a communication hole in communication with the hollow portion;

an electric connection part electrically connected to an external power source, the electric connection part extending in the first direction and penetrating through the hollow portion and the communication hole; and a guide that faces the base and is disposed inside the body, the guide defining a penetrating hole that is in communication with the communication hole and that receives the electric connection part, wherein the guide comprises a plurality of guide portions spaced apart from one another in the first direction, wherein the body comprises an engaging protrusion that extends radially inward from an inner circumferential surface of the body toward the electric connection part, the engaging protrusion supporting one of the plurality of the guide portions, wherein an inner diameter of the engaging protrusion is less than a diameter of the hollow portion and greater than a diameter of the penetrating hole, wherein an inner circumferential surface of the base surrounds the communication hole, wherein the base includes a support protrusion that extends radially inward from the inner circumferential surface of the base toward the electric connection part, the support protrusion supporting another one of the plurality of guide portions, wherein an inner diameter of the support protrusion is less than or equal to a diameter of the communication hole and greater than the diameter of the penetrating hole, wherein the engaging protrusion is in direct contact with and supports a lower surface of the one of the plurality of the guide portions, and wherein the support protrusion is in direct contact with and supports a lower surface of the another one of the plurality of the guide portions.

2. The transfer connector of claim 1, wherein a diameter of the guide is greater than or equal to the diameter of the hollow portion, and wherein the diameter of the communication hole is less than the diameter of the hollow portion.

3. The transfer connector of claim 1, further comprising:
a heat dissipation member that is coupled to an outer circumferential surface of the body and extends radially outward with respect to the electric connection part,
wherein the heat dissipation member comprises a plurality of heat dissipation members that are spaced apart from one another in the first direction.

4. The transfer connector of claim 1, further comprising:
a heat dissipation member that is coupled to an outer circumferential surface of the body and extends radially outward with respect to the electric connection part.

5. The transfer connector of claim 4, further comprising:
a dielectric material disposed in the hollow portion between the inner circumferential surface of the body and an outer circumferential surface of the electric connection part,
wherein the dielectric material comprises quartz, silica, mica, or alumina.

6. The transfer connector of claim 4, wherein the heat dissipation member comprises a plurality of heat dissipation members that are spaced apart from one another in the first direction.

7. The transfer connector of claim 1, wherein the diameter of the communication hole is less than the diameter of the hollow portion, and
wherein the inner diameter of the support protrusion is equal to the diameter of the communication hole.

* * * * *